US012664275B2

(12) United States Patent
Munshani et al.

(10) Patent No.: US 12,664,275 B2
(45) Date of Patent: Jun. 23, 2026

(54) BULK SNAPSHOT RECOVERY

(71) Applicant: Rubrik, Inc., Palo Alto, CA (US)

(72) Inventors: Kunal Sean Munshani, Fremont, CA (US); Benjamin Travis Meadowcroft, Lincoln, CA (US); Karthick Raja Ravichandran, Sunnyvale, CA (US); William Michael Davis, Brisbane (AU); Andrew William Draper, Newcastle-upon-Tyne (GB); Shivanshu Agrawal, Sunnyvale, CA (US); Jonathan Xu, Santa Clara, CA (US)

(73) Assignee: Rubrik, Inc., Palo Alto, CA (US)

( * ) Notice: Subject to any disclaimer, the term of this patent is extended or adjusted under 35 U.S.C. 154(b) by 266 days.

(21) Appl. No.: 17/980,930

(22) Filed: Nov. 4, 2022

(65) Prior Publication Data

US 2023/0147026 A1     May 11, 2023

Related U.S. Application Data

(60) Provisional application No. 63/421,536, filed on Nov. 1, 2022, provisional application No. 63/319,953, filed
(Continued)

(51) Int. Cl.
G06F 21/56 (2013.01)
G06F 11/14 (2006.01)
(Continued)

(52) U.S. Cl.
CPC ........ G06F 21/565 (2013.01); G06F 11/1435 (2013.01); G06F 11/1469 (2013.01);
(Continued)

(58) Field of Classification Search
CPC .. G06F 21/565; G06F 16/156; G06F 11/1435; G06F 11/1469; G06F 21/53;
(Continued)

(56) References Cited

U.S. PATENT DOCUMENTS 8,495,037 B1     7/2013   Westenberg
9,218,252 B1 *  12/2015   Revur ................... G06F 11/004
(Continued)

OTHER PUBLICATIONS

ISA/EP, Int'l App. No. PCT/US2022/079400, Partial International Search Report and Provisional Opinion dated Mar. 7, 2023, 6 pages.
(Continued)

*Primary Examiner* — Ayoub Alata

(74) *Attorney, Agent, or Firm* — Holland & Hart LLP

(57) ABSTRACT

Subject matter related to data management is disclosed. A request to restore target objects of a computing system may be received, where a data management system may store multiple snapshots for the target objects and metadata for the snapshots. The snapshots may be filtered using metadata for the snapshots to obtain a set of snapshots that are available for restoring respective target objects. From among the set of snapshots, suggested snapshots that are available for restoring respective target objects may be identified. The suggested snapshots may be indicated.

20 Claims, 19 Drawing Sheets

Related U.S. Application Data on Mar. 15, 2022, provisional application No. 63/276,822, filed on Nov. 8, 2021.

(51) Int. Cl.
*G06F 11/1446* (2026.01)
*G06F 16/14* (2019.01)
*G06F 21/53* (2013.01)

(52) U.S. Cl.
CPC ............ *G06F 16/156* (2019.01); *G06F 21/53* (2013.01); *G06F 21/56* (2013.01); *G06F 21/568* (2013.01); *G06F 2201/84* (2013.01); *G06F 2221/032* (2013.01); *G06F 2221/034* (2013.01)

(58) Field of Classification Search
CPC .... G06F 21/56; G06F 21/568; G06F 2201/84; G06F 2221/032; G06F 2221/034
See application file for complete search history.

(56) References Cited

U.S. PATENT DOCUMENTS

| | | | | |
|---|---|---|---|---|
| 10,650,146 | B1 | 5/2020 | Gaurav et al. | |
| 10,887,339 | B1 | 1/2021 | Sokolov et al. | |
| 11,681,591 | B2 | 6/2023 | Kulaga et al. | |
| 2007/0245105 | A1* | 10/2007 | Suzuki | G06F 11/1456 |
| | | | | 714/E11.13 |
| 2011/0197279 | A1 | 8/2011 | Ueoka | |
| 2019/0235973 | A1 | 8/2019 | Brewer et al. | |
| 2019/0354443 | A1 | 11/2019 | Haustein et al. | |
| 2020/0159624 | A1 | 5/2020 | Malkov et al. | |
| 2020/0201998 | A1 | 6/2020 | Jung | |
| 2020/0226256 | A1* | 7/2020 | Gaurav | G06F 21/565 |
| 2020/0319979 | A1 | 10/2020 | Kulaga et al. | |
| 2021/0044604 | A1 | 2/2021 | Annen et al. | |
| 2021/0240828 | A1 | 8/2021 | Gaurav et al. | |
| 2022/0100378 | A1* | 3/2022 | Borate | G06F 21/568 |
| 2022/0245250 | A1 | 8/2022 | Warwick et al. | |
| 2022/0345473 | A1* | 10/2022 | Kare | H04L 63/1425 |

OTHER PUBLICATIONS

ISA/EP, Int'l App. No. PCT/US2022/079400, Search Report and Written Opinion dated Mar. 7, 2023, 9 pages.
U.S. Appl. No. 17/980,645, filed Nov. 4, 2022 Pending Indication Infected Snapshots in a Snapshot Chain.
U.S. Appl. No. 17/980,652, filed Nov. 4, 2022 Pending Recovering Infected Snapshots in a Snapshot Chain.
U.S. Appl. No. 17/980,676, filed Nov. 4, 2022 Pending Quarantining Information in Backup Locations.
U.S. Appl. No. 17/980,752, filed Nov. 4, 2022 Pending Recovering Quarantined Information From Backup Locations.
PCT/USZ2/79400 Nov. 7, 2022 Pending Snapshot-Based Malware Management.

* cited by examiner

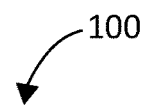
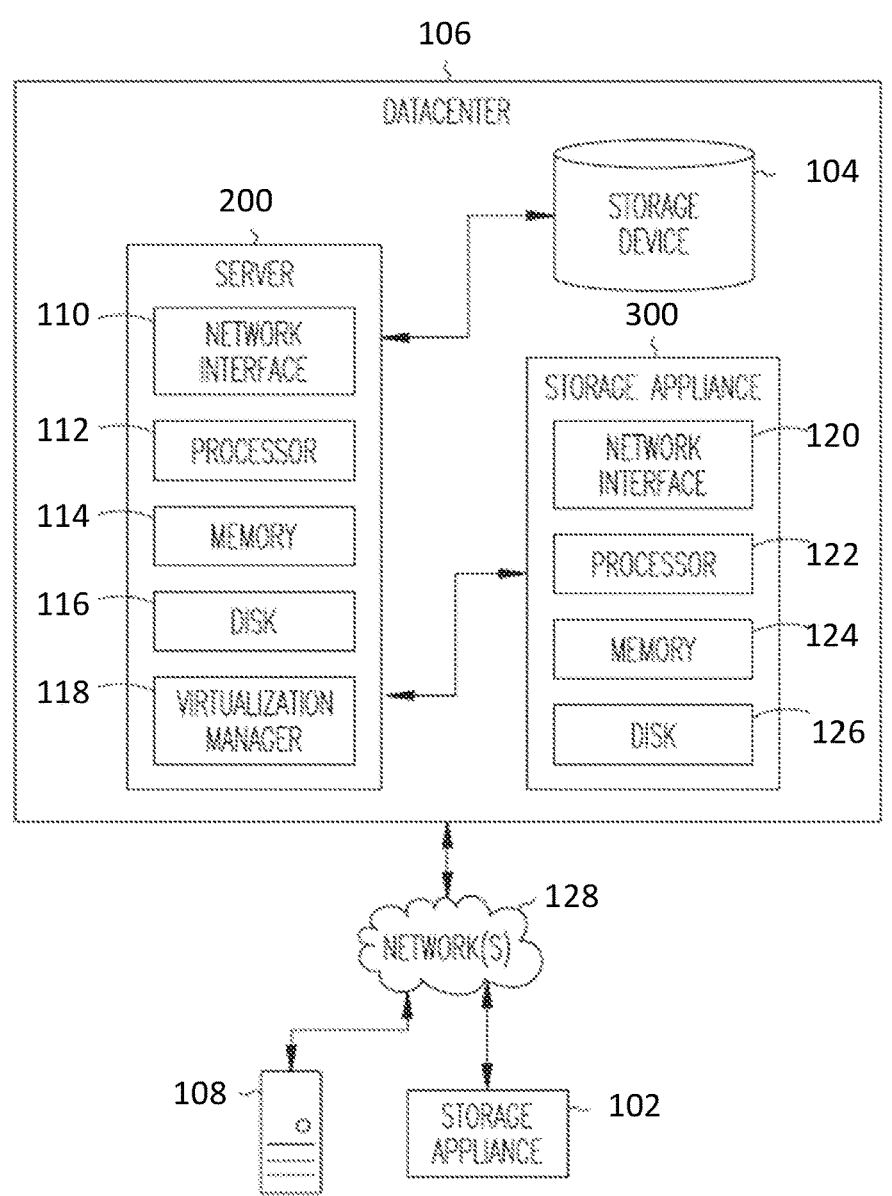
FIG. 1

VIRTUALIZATION LAYER

VIRTUALIZED INFRASTRUCTURE MANAGER — 222

VIRTUAL MACHINE — 220

216 — GUEST OS          APPLICATION — 218

VIRTUAL PROCESSOR — 210

212 — VIRTUAL MEMORY          VIRTUAL DISK — 214

HYPERVISOR LAYER

HYPERVISOR — 208

HARDWARE LAYER

PROCESSOR — 202

204 — MEMORY          DISK — 206

300

SOFTWARE LAYER

| DATA MANAGEMENT SYSTEM | ~ 302 |

| VIRTUALIZATION INTERFACE | ~ 304 |

| VIRTUAL MACHINE SEARCH INDEX | ~ 306 |

| DISTRIBUTED JOB SCHEDULER | ~ 308 |

| DISTRIBUTED METADATA STORE | ~ 310 |

| DISTRIBUTED FILE SYSTEM | ~ 312 |

HARDWARE LAYER

314

PHYSICAL MACHINE

316 — NETWORK INTERFACE

318 — PROCESSOR

320 — MEMORY

322 — DISK

324

PHYSICAL MACHINE

NETWORK INTERFACE — 326

PROCESSOR — 328

MEMORY — 330

DISK — 332

. . .

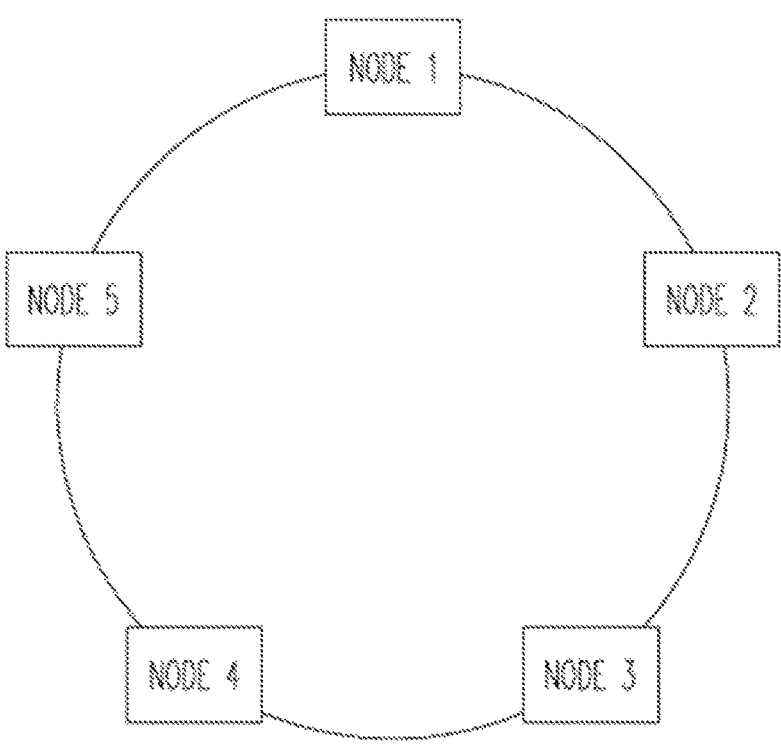
FIG. 4

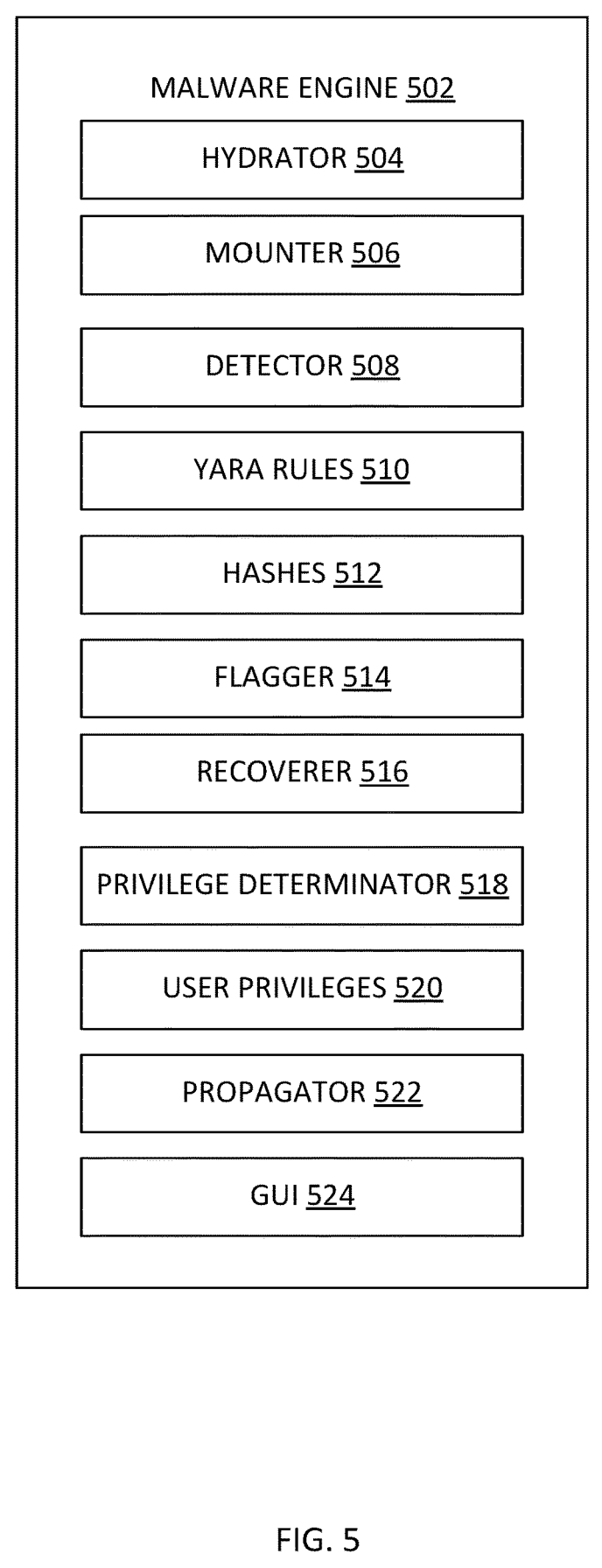

MALWARE ENGINE 502

HYDRATOR 504

MOUNTER 506

DETECTOR 508

YARA RULES 510

HASHES 512

FLAGGER 514

RECOVERER 516

PRIVILEGE DETERMINATOR 518

USER PRIVILEGES 520

PROPAGATOR 522

GUI 524

FIG. 5

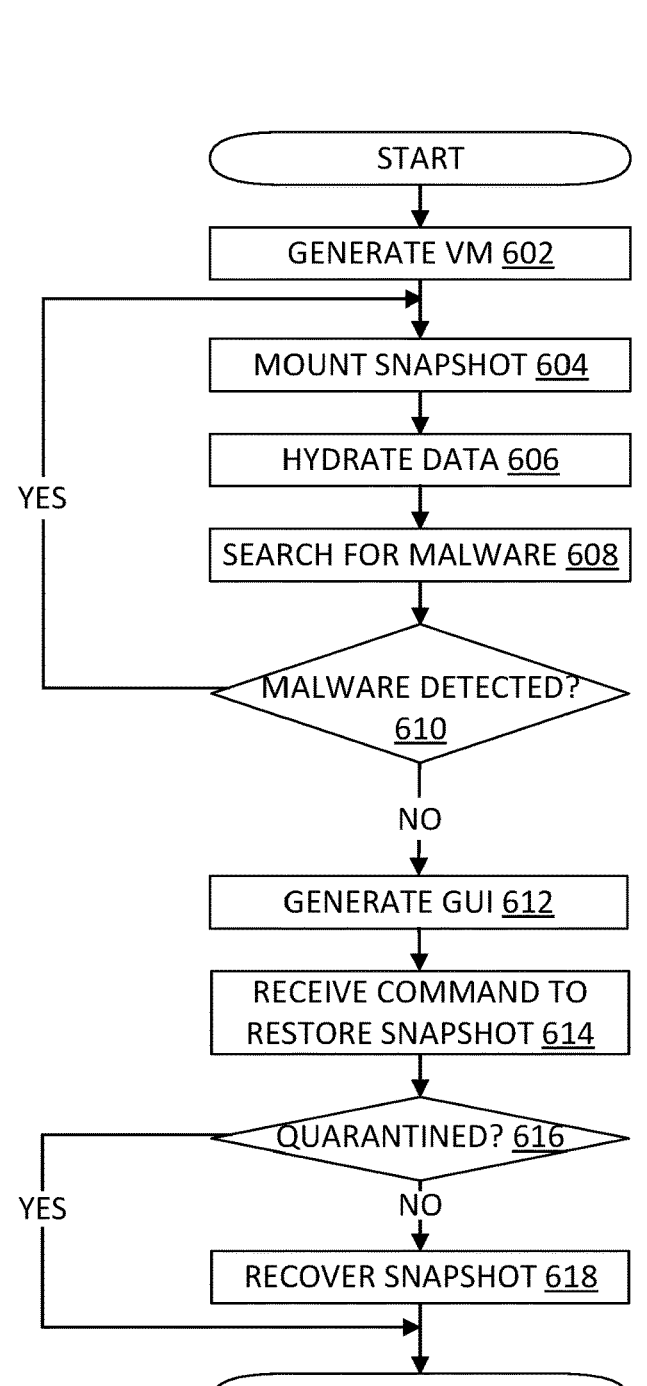
FIG. 6

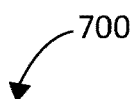
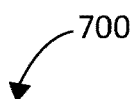
FIG. 7

1000

1100

1200

| Index | Time | Snapshot Identifier | Path Identifier | Operation Identifier |
|-------|------|---------------------|-----------------|----------------------|
| 1 | 1/1/2021 9:00:00 AM | A | volume/usr/folder/file.ext | Quarantined |
| 2 | 1/1/2021 9:01:00 AM | C | volume/usr/folder/* | Quarantined |
| 3 | 1/1/2021 9:01:30 AM | E | volume/usr/folder/file.ext | Quarantined |
| 4 | 1/1/2021 9:02:00 AM | D | volume/usr/folder/file.ext | Quarantined |
| 5 | 1/1/2021 9:02:30 AM | C | volume/usr/folder2/file2.ext | Quarantined |
| 6 | 1/1/2021 9:01:30 AM | E | volume/usr/folder/file2.ext | Quarantined |
| ⋮ | | | | ⋮ |
| 10 | 1/2/2021 10:00:00 AM | A | volume/usr/folder/file.ext | Released |
| 11 | 1/2/2021 10:01:00 AM | D | volume/usr/folder/file.ext | Released |
| 12 | 1/2/2021 10:30:00 AM | C | volume/usr/folder/* | Released |
| 13 | 1/2/2021 10:31:00 AM | E | volume/* | Released |
| ⋮ | | | | ⋮ |
| N | 1/5/2021 8:00:00 AM | F | volume/usr/folder/file.ext | Quarantined |
| | | | | |
| ⋮ | | | | ⋮ |
| | | | | |

| Snapshot Identifier | Time | Path Identifier | Quarantine Status |
|---|---|---|---|
| A | 1/1/2021 9:00:00 AM | volume/usr/folder/file.ext | Quarantined |
| B | 1/1/2021 9:01:00 AM | volume/usr/folder/* | Released |
| C | 1/1/2021 9:01:00 AM | volume/usr/folder/* | Accessible |
| D | 1/1/2021 9:01:00 AM | volume/usr/folder/* | Accessible |
| E | 1/1/2021 9:01:30 AM | volume/usr/folder/file.ext | Quarantined |
| | | ⋮ | |
| H | 1/5/2021 8:00:00 AM | volume/usr/folder/file.ext | Quarantined |
| | | | |
| | | ⋮ | |
| | | | |

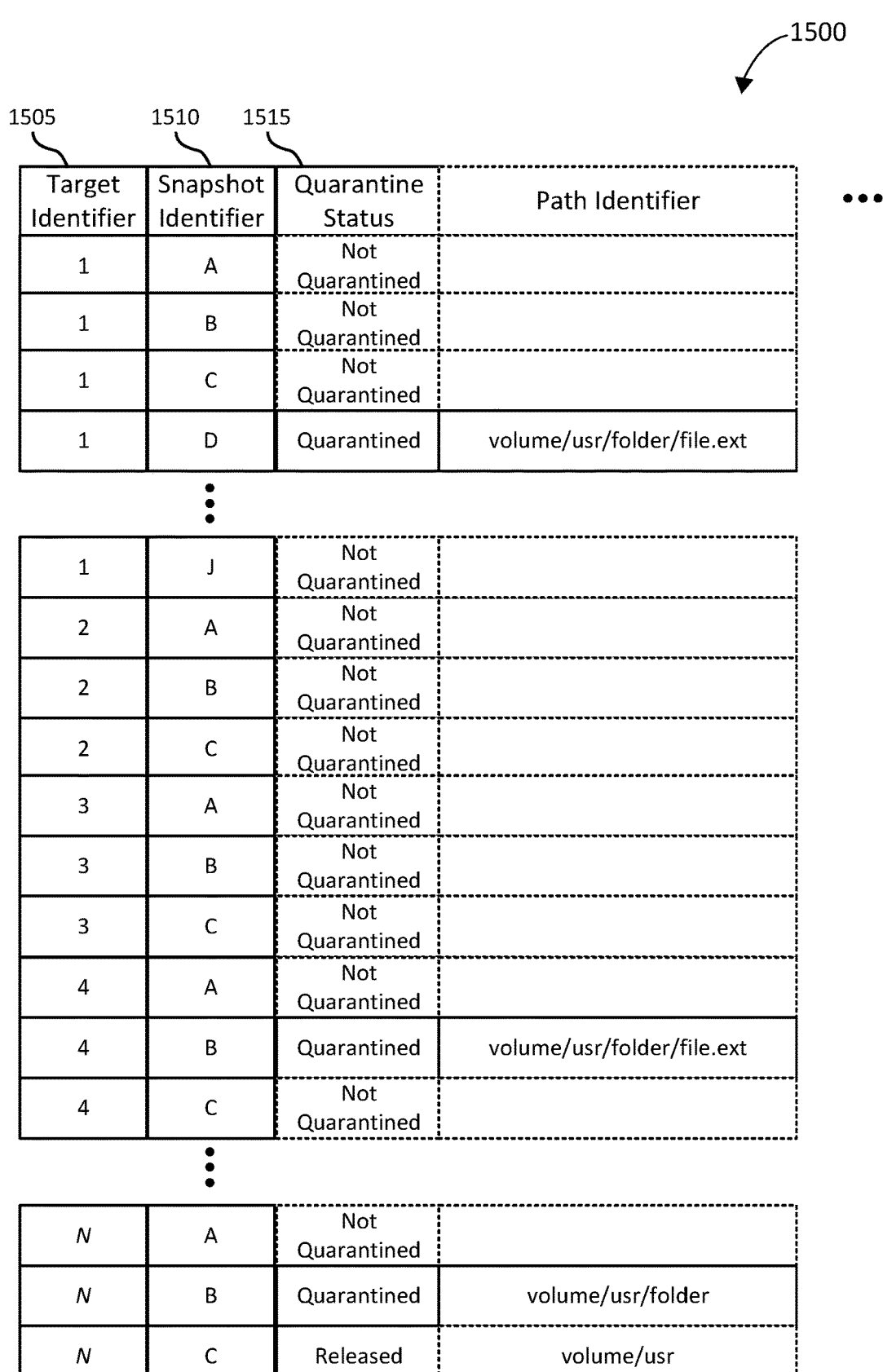

| Target Identifier | Snapshot Identifier | Quarantine Status | Path Identifier | |
|---|---|---|---|---|
| 1505 | 1510 | 1515 | | |
| 1 | A | Not Quarantined | | |
| 1 | B | Not Quarantined | | |
| 1 | C | Not Quarantined | | |
| 1 | D | Quarantined | volume/usr/folder/file.ext | |
| 1 | J | Not Quarantined | | |
| 2 | A | Not Quarantined | | |
| 2 | B | Not Quarantined | | |
| 2 | C | Not Quarantined | | |
| 3 | A | Not Quarantined | | |
| 3 | B | Not Quarantined | | |
| 3 | C | Not Quarantined | | |
| 4 | A | Not Quarantined | | |
| 4 | B | Quarantined | volume/usr/folder/file.ext | |
| 4 | C | Not Quarantined | | |
| N | A | Not Quarantined | | |
| N | B | Quarantined | volume/usr/folder | |
| N | C | Released | volume/usr | |

FIG. 15

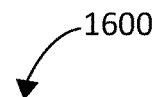
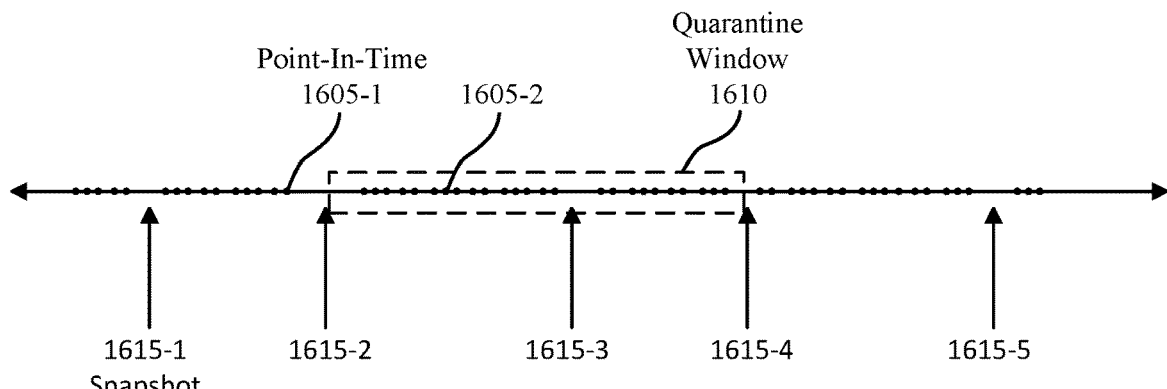
FIG. 16

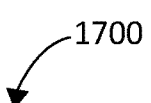
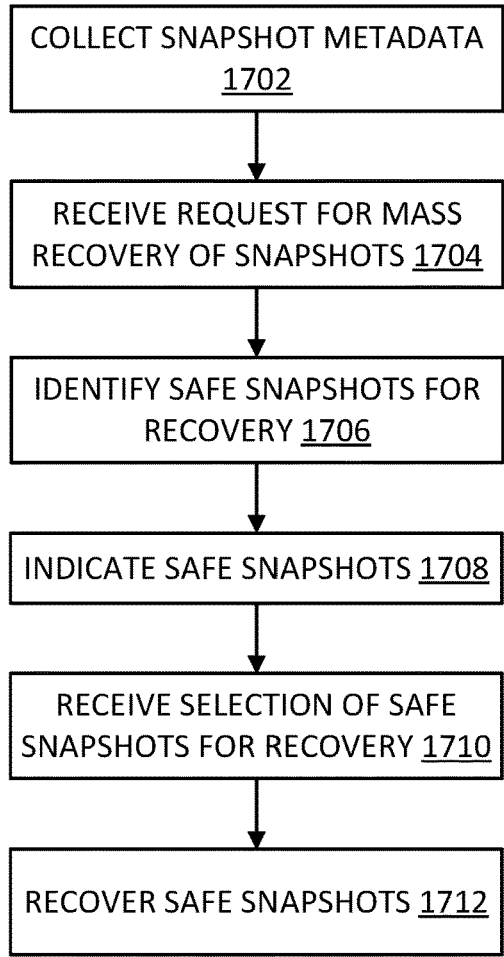
FIG. 17

1800

| Target Identifier | Snapshot Identifier | Creation Time | Expiration Time | Operating Status | Quarantine Status |
|---|---|---|---|---|---|
| 1805 | 1810 | 1815 | 1820 | 1825 | 1830 |
| 1 | A | 1/1/2021 9:00:00 AM | 2/1/2021 9:00:00 AM | Not Anomalous | Not Quarantined |
| 1 | B | 1/5/2021 9:00:00 AM | 2/5/2021 9:00:00 AM | Not Anomalous | Not Quarantined |
| 1 | C | 1/9/2021 9:00:00 AM | 2/9/2021 9:00:00 AM | Not Anomalous | Not Quarantined |
| 1 | D | 1/13/2021 9:00:00 AM | 2/13/2021 9:00:00 AM | Anomalous | Quarantined |
| 1 | J | 2/1/2021 9:00:00 AM | 3/1/2021 9:00:00 AM | Null | Null |
| 2 | A | 11/4/2020 9:00:00 AM | 1/4/2021 9:00:00 AM | Not Anomalous | Not Quarantined |
| 2 | B | 12/4/2020 9:00:00 AM | 2/4/2021 9:00:00 AM | Not Anomalous | Not Quarantined |
| 2 | C | 1/4/2021 9:00:00 AM | 3/4/2021 9:00:00 AM | Not Anomalous | Not Quarantined |
| 3 | A | 12/15/2020 9:00:00 AM | 12/29/2020 9:00:00 AM | Not Anomalous | Not Quarantined |
| 3 | B | 12/21/2020 9:00:00 AM | 1/4/2021 9:00:00 AM | Not Anomalous | Not Quarantined |
| 3 | C | 1/5/2021 9:00:00 AM | 1/19/2021 9:00:00 AM | Not Anomalous | Not Quarantined |
| 4 | A | 12/15/2020 9:00:00 AM | 12/21/2020 9:00:00 AM | Not Anomalous | Not Quarantined |
| 4 | B | 12/21/2020 9:00:00 AM | 1/21/2021 9:00:00 AM | Anomalous | Quarantined |
| 4 | C | 1/5/2021 9:00:00 AM | 2/5/2021 9:00:00 AM | Not Anomalous | Not Quarantined |
| N | A | 12/29/2020 9:00:00 AM | 1/29/2021 9:00:00 AM | Not Anomalous | Not Quarantined |
| N | B | 1/4/2021 9:00:00 AM | 2/4/2021 9:00:00 AM | Anomalous | Quarantined |
| N | C | 1/11/2021 9:00:00 AM | 2/11/2021 9:00:00 AM | Anomalous | Released |

FIG. 18

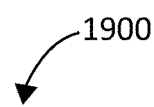
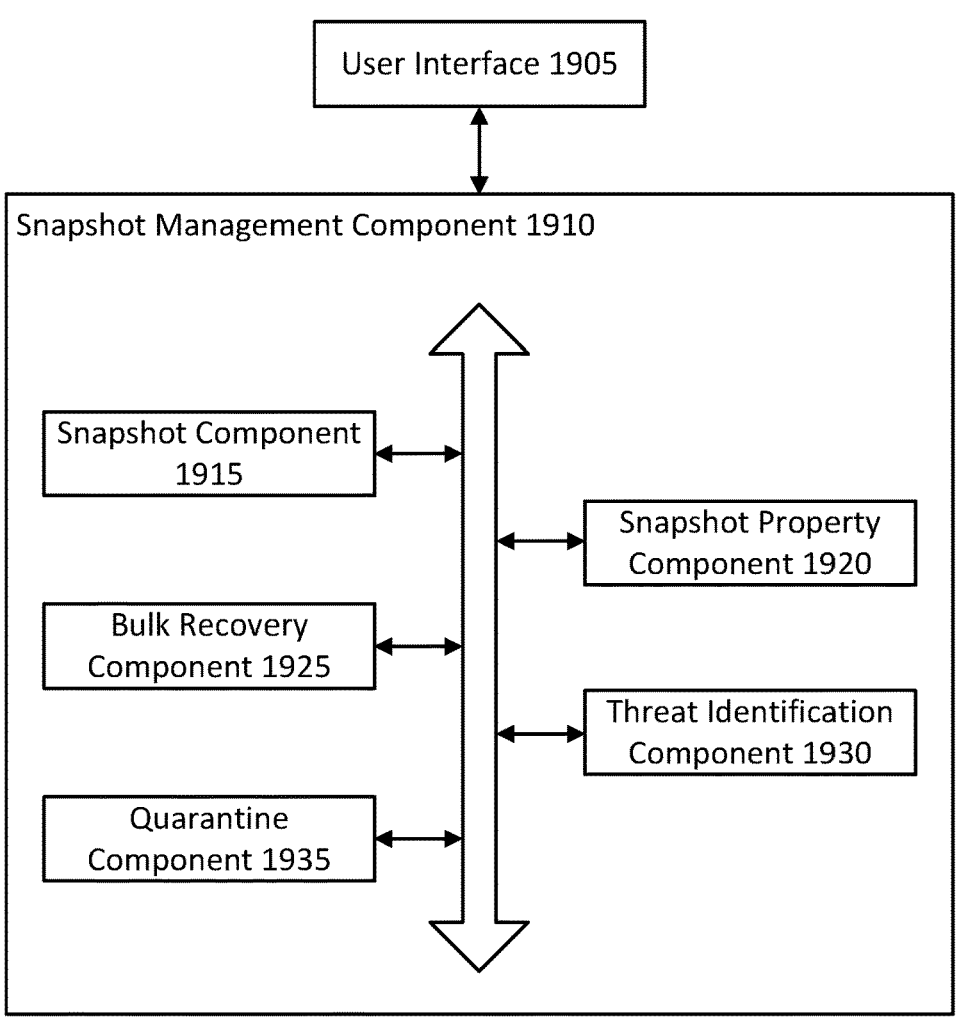
FIG. 19

BULK SNAPSHOT RECOVERY

CROSS REFERENCE

The present application for patent claims the benefit of U.S. Provisional Application No. 63/421,536 by Chandra et al., entitled "BULK SNAPSHOT RECOVERY" and filed Nov. 1, 2022; U.S. Provisional Application No. 63/319,953 by Chandra et al., entitled "QUARANTINING INFORMATION IN BACKUP LOCATIONS" and filed Mar. 15, 2022; and U.S. Provisional Application No. 63/276,822 by Gee et al., entitled "MALWARE DETECTION IN SNAPSHOTS" and filed Nov. 8, 2021, each of which is assigned to the assignee hereof and expressly incorporated by reference herein.

TECHNICAL FIELD

The present disclosure relates generally to data management including techniques for bulk snapshot recovery.

BACKGROUND

The volume and complexity of data that is collected, analyzed and stored is increasing rapidly over time. The computer infrastructure used to handle this data is also becoming more complex, with more processing power and more portability. As a result, data management and storage is becoming increasingly important. Significant issues of these processes include access to reliable data backup and storage, and fast data recovery in cases of failure. Other aspects include data portability across locations and platforms.

BRIEF DESCRIPTION OF THE DRAWINGS

FIG. 1 depicts one embodiment of a networked computing environment in which the disclosed technology may be practiced, according to an example embodiment.

FIG. 4 shows an example cluster of a distributed decentralized database, according to some example embodiments.

FIG. 5 depicts a block diagram of a malware engine according to an example embodiment.

FIG. 6 depicts a flowchart illustrating a method of scanning a snapshot for malware according to an example embodiment.

FIG. 7 depicts an example interface according to an example embodiment.

FIGS. 12 and 13 depict example ledgers that support recording quarantining and release operations according to an example embodiment.

FIG. 15 depicts an example ledger that supports recording quarantining and release operations according to an example embodiment.

FIG. 16 depicts an example recovery timeline that supports recording quarantining and release operations according to an example embodiment.

FIG. 17 depicts a flowchart illustrating a method for bulk snapshot recovery according to an example embodiment.

FIG. 18 depicts a schema that supports bulk snapshot recovery according to an example embodiment.

FIG. 19 depicts a block diagram that supports bulk snapshot recovery according to an example embodiment.

DETAILED DESCRIPTION

Figure 2:
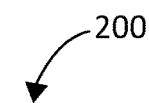
FIG. 2 depicts one embodiment of the server of FIG. 1, according to an example embodiment.

The description that follows includes systems, methods, techniques, instruction sequences, and computing machine program products that embody illustrative embodiments of the present disclosure. In the following description, for purposes of explanation, numerous specific details are set forth in order to provide a thorough understanding of example embodiments. It will be evident, however, to one skilled in the art that the present inventive subject matter may be practiced without these specific details.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Rubrik, Inc., 2018-2021, All Rights Reserved.

It will be appreciated that some of the examples disclosed herein are described in the context of virtual machines that are backed up by using base and incremental snapshots, for example. This should not necessarily be regarded as limiting of the disclosures. The disclosures, systems and methods described herein apply not only to virtual machines of all types that run a file system (for example), but also to NAS devices, physical machines (for example Linux servers), and databases.

FIG. 1 depicts one embodiment of a networked computing environment 100 in which the disclosed technology may be practiced. As depicted, the networked computing environment 100 includes a data center 106, a storage appliance 102, and a computing device 108 in communication with each other via one or more networks 128. The networked computing environment 100 may also include a plurality of computing devices interconnected through one or more networks 128. The one or more networks 128 may allow computing devices and/or storage devices to connect to and communicate with other computing devices and/or other storage devices. In some cases, the networked computing environment 100 may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system.

The data center 106 may include one or more servers, such as server 200, in communication with one or more storage devices, such as storage device 104. The one or more servers may also be in communication with one or more storage appliances, such as storage appliance 102. The server 200, storage device 104, and storage appliance 300 may be in communication with each other via a networking fabric connecting servers and data storage units within the data center 106 to each other. The storage appliance 300 may include a data management system for backing up virtual machines and/or files within a virtualized infrastructure. The server 200 may be used to create and manage one or more virtual machines associated with a virtualized infrastructure.

The one or more virtual machines may run various applications, such as a database application or a web server. The storage device 104 may include one or more hardware storage devices for storing data, such as a hard disk drive (HDD), a magnetic tape drive, a solid-state drive (SSD), a storage area network (SAN) storage device, or a Networked-Attached Storage (NAS) device. In some cases, a data center 106, may include thousands of servers and/or data storage devices in communication with each other. The one or more data storage devices 104 may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 128 may include a secure network such as an enterprise private network, an unsecure network such as a wireless open network, a local area network (LAN), a wide area network (WAN), and the Internet. The one or more networks 128 may include a cellular network, a mobile network, a wireless network, or a wired network. Each network of the one or more networks 128 may include hubs, bridges, routers, switches, and wired transmission media such as a direct-wired connection. The one or more networks 128 may include an extranet or other private network for securely sharing information or providing controlled access to applications or files.

A server, such as server 200, may allow a client to download information or files (e.g., executable, text, application, audio, image, or video files) from the server 200 or to perform a search query related to particular information stored on the server 200. In some cases, a server may act as an application server or a file server. In general, server 200 may refer to a hardware device that acts as the host in a client-server relationship or a software process that shares a resource with or performs work for one or more clients.

One embodiment of server 200 includes a network interface 110, processor 112, memory 114, disk 116, and virtualization manager 118 all in communication with each other. Network interface 110 allows server 200 to connect to one or more networks 128. Network interface 110 may include a wireless network interface and/or a wired network interface. Processor 112 allows server 200 to execute computer-readable instructions stored in memory 114 in order to perform processes described herein. Processor 112 may include one or more processing units, such as one or more CPUs and/or one or more GPUs. Memory 114 may comprise one or more types of memory (e.g., RAM, SRAM, DRAM, ROM, EEPROM, Flash, etc.). Disk 116 may include a hard disk drive and/or a solid-state drive. Memory 114 and disk 116 may comprise hardware storage devices.

The virtualization manager 118 may manage a virtualized infrastructure and perform management operations associated with the virtualized infrastructure. The virtualization manager 118 may manage the provisioning of virtual machines running within the virtualized infrastructure and provide an interface to computing devices interacting with the virtualized infrastructure. In one example, the virtualization manager 118 may set a virtual machine having a virtual disk into a frozen state in response to a snapshot request made via an application programming interface (API) by a storage appliance, such as storage appliance 300. Setting the virtual machine into a frozen state may allow a point in time snapshot of the virtual machine to be stored or transferred. In one example, updates made to a virtual machine that has been set into a frozen state may be written to a separate file (e.g., an update file) while the virtual disk may be set into a read-only state to prevent modifications to the virtual disk file while the virtual machine is in the frozen state.

The virtualization manager 118 may then transfer data associated with the virtual machine (e.g., an image of the virtual machine or a portion of the image of the virtual disk file associated with the state of the virtual disk at the point in time it is frozen) to a storage appliance (for example, a storage appliance 102 or storage appliance 300 of FIG. 1, described further below) in response to a request made by the storage appliance. After the data associated with the point in time snapshot of the virtual machine has been transferred to the storage appliance 300 (for example), the virtual machine may be released from the frozen state (i.e., unfrozen) and the updates made to the virtual machine and stored in the separate file may be merged into the virtual disk file. The virtualization manager 118 may perform various virtual machine-related tasks, such as cloning virtual machines, creating new virtual machines, monitoring the state of virtual machines, moving virtual machines between physical hosts for load balancing purposes, and facilitating backups of virtual machines.

One embodiment of a storage appliance 300 (or storage appliance 102) includes a network interface 120, processor 122, memory 124, and disk 126 all in communication with each other. Network interface 120 allows storage appliance 300 to connect to one or more networks 128. Network interface 120 may include a wireless network interface and/or a wired network interface. Processor 122 allows storage appliance 300 to execute computer readable instructions stored in memory 124 in order to perform processes described herein. Processor 122 may include one or more processing units, such as one or more CPUs and/or one or more GPUs. Memory 124 may comprise one or more types of memory (e.g., RAM, SRAM, DRAM, ROM, EEPROM, NOR Flash, NAND Flash, etc.). Disk 126 may include a hard disk drive and/or a solid-state drive. Memory 124 and disk 126 may comprise hardware storage devices.

In one embodiment, the storage appliance 300 may include four machines. Each of the four machines may include a multi-core CPU, 64 GB of RAM, a 400 GB SSD, three 4 TB HDDs, and a network interface controller. In this case, the four machines may be in communication with the one or more networks 128 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point-in-time versions of the virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one embodiment, the networked computing environment 100 may include a virtualized infrastructure that provides software, data processing, and/or data storage services to end users accessing the services via the networked computing environment 100. In one example, networked computing environment 100 may provide cloud-based work productivity or business-related applications to a computing device, such as computing device 108. The storage appliance 102 may comprise a cloud-based data management system for backing up virtual machines and/or files within a virtualized infrastructure, such as virtual machines running on server 200/or files stored on server 200.

In some cases, networked computing environment 100 may provide remote access to secure applications and files stored within data center 106 from a remote computing device, such as computing device 108. The data center 106 may use an access control application to manage remote access to protected resources, such as protected applications, databases, or files located within the data center 106. To facilitate remote access to secure applications and files, a secure network connection may be established using a virtual private network (VPN). A VPN connection may allow a remote computing device, such as computing device 108, to securely access data from a private network (e.g., from a company file server or mail server) using an unsecure public network or the Internet. The VPN connection may require client-side software (e.g., running on the remote computing device) to establish and maintain the VPN connection. The VPN client software may provide data encryption and encapsulation prior to the transmission of secure private network traffic through the Internet.

In some embodiments, the storage appliance 300 may manage the extraction and storage of virtual machine snapshots associated with different point in time versions of one or more virtual machines running within the data center 106. A snapshot of a virtual machine may correspond with a state of the virtual machine at a particular point-in-time. In response to a restore command from the storage device 104, the storage appliance 300 may restore a point-in-time version of a virtual machine or restore point-in-time versions of one or more files located on the virtual machine and transmit the restored data to the server 200. In response to a mount command from the server 200, the storage appliance 300 may allow a point-in-time version of a virtual machine to be mounted and allow the server 200 to read and/or modify data associated with the point-in-time version of the virtual machine. To improve storage density, the storage appliance 300 may deduplicate and compress data associated with different versions of a virtual machine and/or deduplicate and compress data associated with different virtual machines. To improve system performance, the storage appliance 300 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 300 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 300 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 300 may run an NFS server and make the particular version (or a copy of the particular version) of the virtual machine accessible for reading and/or writing. The end user of the storage appliance 300 may then select the particular version to be mounted and run an application (e.g., a data analytics application) using the mounted version of the virtual machine. In another example, the particular version may be mounted as an iSCSI target.

FIG. 2 depicts one embodiment of server 200 of FIG. 1. The server 200 may comprise one server out of a plurality of servers that are networked together within a data center (e.g., data center 106). In one example, the plurality of servers may be positioned within one or more server racks within the data center. As depicted, the server 200 includes hardware-level components and software-level components. The hardware-level components include one or more processors 202, one or more memory 204, and one or more disks 206. The software-level components include a hypervisor 208, a virtualized infrastructure manager 222, and one or more virtual machines, such as virtual machine 220. The hypervisor 208 may comprise a native hypervisor or a hosted hypervisor. The hypervisor 208 may provide a virtual operating platform for running one or more virtual machines, such as virtual machine 220. Virtual machine 220 includes a plurality of virtual hardware devices including a virtual processor 210, a virtual memory 212, and a virtual disk 214. The virtual disk 214 may comprise a file stored within the one or more disks 206. In one example, a virtual machine 220 may include a plurality of virtual disks 214, with each virtual disk of the plurality of virtual disks 214 associated with a different file stored on the one or more disks 206. Virtual machine 220 may include a guest operating system 216 that runs one or more applications, such as application 218.

The virtualized infrastructure manager 222, which may correspond with the virtualization manager 118 in FIG. 1, may run on a virtual machine or natively on the server 200. The virtual machine may, for example, be or include the virtual machine 220 or a virtual machine separate from the server 200. Other arrangements are possible. The virtualized infrastructure manager 222 may provide a centralized platform for managing a virtualized infrastructure that includes a plurality of virtual machines. The virtualized infrastructure manager 222 may manage the provisioning of virtual machines running within the virtualized infrastructure and provide an interface to computing devices interacting with the virtualized infrastructure. The virtualized infrastructure manager 222 may perform various virtualized infrastructure related tasks, such as cloning virtual machines, creating new virtual machines, monitoring the state of virtual machines, and facilitating backups of virtual machines.

In one embodiment, the server 200 may use the virtualized infrastructure manager 222 to facilitate backups for a plurality of virtual machines (e.g., eight different virtual machines) running on the server 200. Each virtual machine running on the server 200 may run its own guest operating system and its own set of applications. Each virtual machine running on the server 200 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 102 in FIG. 1 or storage appliance 300 in FIG. 1, may request a snapshot of a virtual machine running on server 200. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time and a second snapshot of the virtual machine may correspond with a second state of the virtual machine at a second point in time subsequent to the first point in time.

In response to a request for a snapshot of a virtual machine at a particular point in time, the virtualized infrastructure manager 222 may set the virtual machine into a frozen state or store a copy of the virtual machine at the particular point in time. The virtualized infrastructure manager 222 may then transfer data associated with the virtual machine (e.g., an image of the virtual machine or a portion of the image of the virtual machine) to the storage appliance 300 or storage appliance 102. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 222 may transfer a full image of the virtual machine to the storage appliance 102 or storage appliance 300 of FIG. 1 or a plurality of data blocks corresponding with the full image (e.g., to enable a full image-level backup of the virtual machine to be stored on the storage appliance). In other cases, the virtualized infrastructure manager 222 may transfer a portion of an image of the virtual machine associated with data that has changed since an earlier point in time prior to the particular point in time or since a last snapshot of the virtual machine was taken. In one example, the virtualized infrastructure manager 222 may transfer only data associated with virtual blocks stored on a virtual disk of the virtual machine that have changed since the last snapshot of the virtual machine was taken. In one embodiment, the data management application may specify a first point in time and a second point in time and the virtualized infrastructure manager 222 may output one or more virtual data blocks associated with the virtual machine that have been modified between the first point in time and the second point in time.

In some embodiments, the server 200 or the hypervisor 208 may communicate with a storage appliance, such as storage appliance 102 in FIG. 1 or storage appliance 300 in FIG. 1, using a distributed file system protocol such as Network File System (NFS) Version 3, or Server Message Block (SMB) protocol. The distributed file system protocol may allow the server 200 or the hypervisor 208 to access, read, write, or modify files stored on the storage appliance as if the files were locally stored on the server 200. The distributed file system protocol may allow the server 200 or the hypervisor 208 to mount a directory or a portion of a file system located within the storage appliance.

Figure 3:
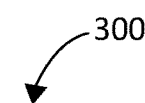
FIG. 3 depicts one embodiment of the storage appliance of FIG. 1, according to an example embodiment.

FIG. 3 depicts one embodiment of storage appliance 300 in FIG. 1. The storage appliance may include a plurality of physical machines that may be grouped together and presented as a single computing system. Each physical machine of the plurality of physical machines may comprise a node in a cluster (e.g., a failover cluster). In one example, the storage appliance may be positioned within a server rack within a data center. As depicted, the storage appliance 300 includes hardware-level components and software-level components. The hardware-level components include one or more physical machines, such as physical machine 314 and physical machine 324. The physical machine 314 includes a network interface 316, processor 318, memory 320, and disk 322 all in communication with each other. Processor 318 allows physical machine 314 to execute computer readable instructions stored in memory 320 to perform processes described herein. Disk 322 may include a hard disk drive and/or a solid-state drive. The physical machine 324 includes a network interface 326, processor 328, memory 330, and disk 332 all in communication with each other. Processor 328 allows physical machine 324 to execute computer readable instructions stored in memory 330 to perform processes described herein. Disk 332 may include a hard disk drive and/or a solid-state drive. In some cases, disk 332 may include a flash-based SSD or a hybrid HDD/SSD drive. In one embodiment, the storage appliance 300 may include a plurality of physical machines arranged in a cluster (e.g., eight machines in a cluster). Each of the plurality of physical machines may include a plurality of multi-core CPUs, 108 GB of RAM, a 500 GB SSD, four 4 TB HDDs, and a network interface controller.

In some embodiments, the plurality of physical machines may be used to implement a cluster-based network file-server. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 200 in FIG. 1, or a hypervisor, such as hypervisor 208 in FIG. 2, to communicate with the storage appliance 300 may not provide a failover mechanism (e.g., NFS Version 3). In the case that no failover mechanism is provided on the client side, the hypervisor may not be able to connect to a new node within a cluster in the event that the node connected to the hypervisor fails.

In some embodiments, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 208 in FIG. 2, may be configured with a first floating IP address associated with a first node in the cluster. The hypervisor may connect to the cluster using the first floating IP address. In one example, the hypervisor may communicate with the cluster using the NFS Version 3 protocol. Each node in the cluster may run a Virtual Router Redundancy Protocol (VRRP) daemon. A daemon may comprise a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N−1), for a floating IP address (i), the VRRP priority of nodeG) may be G-i modulo N. In another example, given a number (N) of nodes in a cluster from node(0) to node(N−1), for a floating IP address (i), the VRRP priority of nodeG) may be (i-j) modulo N. In these cases, nodeG) will assume floating IP address (i) only if its VRRP priority is higher than that of any other node in the cluster that is alive and announcing itself on the network. Thus, if a node fails, then there may be a clear priority ordering for determining which other node in the cluster will take over the failed node's floating IP address.

In some cases, a cluster may include a plurality of nodes and each node of the plurality of nodes may be assigned a different floating IP address. In this case, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 3, the software-level components of the storage appliance 300 may include data management system 302, a virtualization interface 304, a distributed job scheduler 308, a distributed metadata store 310, a distributed file system 312, and one or more virtual machine search indexes, such as virtual machine search index 306. In one embodiment, the software-level components of the storage appliance 300 may be run using a dedicated hardware-based appliance. In another embodiment, the software-level components of the storage appliance 300 may be run from the cloud (e.g., the software-level components may be installed on a cloud service provider).

In some cases, the data storage across a plurality of nodes in a cluster (e.g., the data storage available from the one or more physical machine (e.g., physical machine 314 and physical machine 324)) may be aggregated and made available over a single file system namespace (e.g., /snapshots/). A directory for each virtual machine protected using the storage appliance 300 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed file system 312 may present itself as a single file system, in which as new physical machines or nodes are added to the storage appliance 300, the cluster may automatically discover the additional nodes and automatically increase the available capacity of the file system for storing files and other data. Each file stored in the distributed file system 312 may be partitioned into one or more chunks or shards. Each of the one or more chunks may be stored within the distributed file system 312 as a separate file. The files stored within the distributed file system 312 may be replicated or mirrored over a plurality of physical machines, thereby creating a load-balanced and fault tolerant distributed file system. In one example, storage appliance 300 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 310 may include a distributed database management system that provides high availability without a single point of failure. In one embodiment, the distributed metadata store 310 may comprise a database, such as a distributed document-oriented database. The distributed metadata store 310 may be used as a distributed key value storage system. In one example, the distributed metadata store 310 may comprise a distributed NoSQL key value store database. In some cases, the distributed metadata store 310 may include a partitioned row store, in which rows are organized into tables or other collections of related data held within a structured format within the key value store database. A table (or a set of tables) may be used to store metadata information associated with one or more files stored within the distributed file system 312. The metadata information may include the name of a file, a size of the file, file permissions associated with the file, when the file was last modified, and file mapping information associated with an identification of the location of the file stored within a cluster of physical machines.

In one embodiment, a new file corresponding with a snapshot of a virtual machine may be stored within the distributed file system 312 and metadata associated with the new file may be stored within the distributed metadata store 310. The distributed metadata store 310 may also be used to store a backup schedule for the virtual machine and a list of snapshots for the virtual machine that are stored using the storage appliance 300. In some examples, the metadata for a snapshot may include a time when the snapshot was taken, an expiration time for the snapshot, a quarantine status of the snapshot, and anomalous status of the snapshot (e.g., if malware is identified in the snapshot during ingestion, etc.). As described in more detail herein, including with reference to FIGS. 17 through 19, the metadata stored for a snapshot may be used to facilitate a mass recovery of multiple snapshots across multiple target objects (e.g., which may be referred to as workloads or snappables) protected by the data management system 302.

In some cases, the distributed metadata store 310 may be used to manage one or more versions of a virtual machine. Each version of the virtual machine may correspond with a full image snapshot of the virtual machine stored within the distributed file system 312 or an incremental snapshot of the virtual machine (e.g., a forward incremental or reverse incremental) stored within the distributed file system 312. In one embodiment, the one or more versions of the virtual machine may correspond with a plurality of files. The plurality of files may include a single full image snapshot of the virtual machine and one or more incremental aspects derived from the single full image snapshot. The single full image snapshot of the virtual machine may be stored using a first storage device of a first type (e.g., an HDD) and the one or more incremental aspects derived from the single full image snapshot may be stored using a second storage device of a second type (e.g., an SSD). In this case, only a single full image needs to be stored and each version of the virtual machine may be generated from the single full image or the single full image combined with a subset of the one or more incremental aspects. Furthermore, each version of the virtual machine may be generated by performing a sequential read from the first storage device (e.g., reading a single file from an HDD) to acquire the full image and, in parallel, performing one or more reads from the second storage device (e.g., performing fast random reads from an SSD) to acquire the one or more incremental aspects.

The distributed job scheduler 308 may be used for scheduling backup jobs that acquire and store virtual machine snapshots for one or more virtual machines over time. The distributed job scheduler 308 may follow a backup schedule to back up an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. Each backup job may be associated with one or more tasks to be performed in a sequence. Each of the one or more tasks associated with a job may be run on a particular node within a cluster. In some cases, the distributed job scheduler 308 may schedule a specific job to be run on a particular node based on data stored on the particular node. For example, the distributed job scheduler 308 may schedule a virtual machine snapshot job to be run on a node in a cluster that is used to store snapshots of the virtual machine in order to reduce network congestion.

The distributed job scheduler 308 may comprise a distributed fault tolerant job scheduler, in which jobs affected by node failures are recovered and rescheduled to be run on available nodes. In one embodiment, the distributed job scheduler 308 may be fully decentralized and implemented without the existence of a master node. The distributed job scheduler 308 may run job scheduling processes on each node in a cluster or on a plurality of nodes in the cluster. In one example, the distributed job scheduler 308 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 310. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 308 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 308 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks was ever performed. The series of tasks may correspond with an ordering of tasks for the series of tasks and the distributed job scheduler 308 may ensure that each task of the series of tasks is executed based on the ordering of tasks. Tasks that do not have dependencies with each other may be executed in parallel.

In some cases, the distributed job scheduler 308 may schedule each task of a series of tasks to be performed on a specific node in a cluster. In other cases, the distributed job scheduler 308 may schedule a first task of the series of tasks to be performed on a first node in a cluster and a second task of the series of tasks to be performed on a second node in the cluster. In these cases, the first task may have to operate on a first set of data (e.g., a first file stored in a file system) stored on the first node and the second task may have to operate on a second set of data (e.g., metadata related to the first file that is stored in a database) stored on the second node. In some embodiments, one or more tasks associated with a job may have an affinity to a specific node in a cluster.

In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 308 may assign one or more tasks associated with a job to be executed on a particular node in a cluster based on the location of data required to be accessed by the one or more tasks.

In one embodiment, the distributed job scheduler 308 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 222 in FIG. 2, to create a frozen copy of the virtual machine and to transfer one or more chunks (or one or more files) associated with the frozen copy to a storage appliance, such as storage appliance 300 in FIG. 1. The one or more tasks may also include generating metadata for the one or more chunks, storing the metadata using the distributed metadata store 310, storing the one or more chunks within the distributed file system 312, and communicating with the virtualized infrastructure manager 222 that the frozen copy of the virtual machine may be unfrozen or released from a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 92 (e.g., the first chunk is located at/snapshotsNM_B/s1/ s1.chunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption related tasks.

The virtualization interface 304 may provide an interface for communicating with a virtualized infrastructure manager managing a virtualization infrastructure, such as virtualized infrastructure manager 222 in FIG. 2, and requesting data associated with virtual machine snapshots from the virtualization infrastructure. The virtualization interface 304 may communicate with the virtualized infrastructure manager using an Application Programming Interface (API) for accessing the virtualized infrastructure manager (e.g., to communicate a request for a snapshot of a virtual machine). In this case, storage appliance 300 may request and receive data from a virtualized infrastructure without requiring agent software to be installed or running on virtual machines within the virtualized infrastructure. The virtualization interface 304 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance. However, if the snapshot of the virtual machine is not the first snapshot taken of the virtual machine, then only the data blocks of the virtual machine that have changed since a prior snapshot was taken may be transferred to the storage appliance.

The virtual machine search index 306 may include a list of files that have been stored using a virtual machine and a version history for each of the files in the list. Each version of a file may be mapped to the earliest point-in-time snapshot of the virtual machine that includes the version of the file or to a snapshot of the virtual machine that includes the version of the file (e.g., the latest point in time snapshot of the virtual machine that includes the version of the file). In one example, the virtual machine search index 306 may be used to identify a version of the virtual machine that includes a particular version of a file (e.g., a particular version of a database, a spreadsheet, or a word processing document). In some cases, each of the virtual machines that are backed up or protected using storage appliance 300 may have a corresponding virtual machine search index.

In one embodiment, as each snapshot of a virtual machine is ingested, each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some cases, if a virtual machine includes a plurality of virtual disks, then a virtual machine search index may be generated for each virtual disk of the plurality of virtual disks. For example, a first virtual machine search index may catalog and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 312 in FIG. 3.

The data management system 302 may comprise an application running on the storage appliance 300 that manages and stores one or more snapshots of a virtual machine.

In one example, the data management system 302 may comprise a highest-level layer in an integrated software stack running on the storage appliance. The integrated software stack may include the data management system 302, the virtualization interface 304, the distributed job scheduler 308, the distributed metadata store 310, and the distributed file system 312.

In some cases, the integrated software stack may run on other computing devices, such as a server or computing device 108 in FIG. 1. The data management system 302 may use the virtualization interface 304, the distributed job scheduler 308, the distributed metadata store 310, and the distributed file system 312 to manage and store one or more snapshots of a virtual machine. Each snapshot of the virtual machine may correspond with a point-in-time version of the virtual machine. The data management system 302 may generate and manage a list of versions for the virtual machine. Each version of the virtual machine may map to or reference one or more chunks and/or one or more files stored within the distributed file system 312. Combined together, the one or more chunks and/or the one or more files stored within the distributed file system 312 may comprise a full image of the version of the virtual machine.

FIG. 4 shows an example cluster 400 of a distributed decentralized database, according to some example embodiments. As illustrated, the example cluster 400 includes five nodes, nodes 1-5. In some example embodiments, each of the five nodes runs from different machines, such as physical machine 314 in FIG. 3 or virtual machine 220 in FIG. 2. The nodes in the example cluster 400 can include instances of peer nodes of a distributed database (e.g., cluster-based database, distributed decentralized database management system, a NoSQL database, Apache Cassandra, DataStax, MongoDB, CouchDB), according to some example embodiments. The distributed database system is distributed in that data is sharded or distributed across the example cluster 400 in shards or chunks and decentralized in that there is no central storage device and no single point of failure. The system operates under an assumption that multiple nodes may go down, up, or become non-responsive, and so on. Sharding is splitting up of the data horizontally and managing each shard separately on different nodes. For example, if the data managed by the example cluster 400 can be indexed using the 26 letters of the alphabet, node 1 can manage a first shard that handles records that start with A through E, node 2 can manage a second shard that handles records that start with F through J, and so on.

In some example embodiments, data written to one of the nodes is replicated to one or more other nodes per a replication protocol of the example cluster 400. For example, data written to node 1 can be replicated to nodes 2 and 3. If node 1 prematurely terminates, node 2 and/or 3 can be used to provide the replicated data. In some example embodiments, each node of example cluster 400 frequently exchanges state information about itself and other nodes across the example cluster 400 using gossip protocol. Gossip protocol is a peer-to-peer communication protocol in which each node randomly shares (e.g., communicates, requests, transmits) location and state information about the other nodes in a given cluster.

Writing: For a given node, a sequentially written commit log captures the write activity to ensure data durability. The data is then written to an in-memory structure (e.g., a memtable, write-back cache). Each time the in-memory structure is full, the data is written to disk in a Sorted String Table data file. In some example embodiments, writes are automatically partitioned and replicated throughout the example cluster 400.

Reading: Any node of example cluster 400 can receive a read request (e.g., query) from an external client. If the node that receives the read request manages the data requested, the node provides the requested data. If the node does not manage the data, the node determines which node manages the requested data. The node that received the read request then acts as a proxy between the requesting entity and the node that manages the data (e.g., the node that manages the data sends the data to the proxy node, which then provides the data to an external entity that generated the request).

The distributed decentralized database system is decentralized in that there is no single point of failure due to the nodes being symmetrical and seamlessly replaceable. For example, whereas conventional distributed data implementations have nodes with different functions (e.g., master/slave nodes, asymmetrical database nodes, federated databases), the nodes of example cluster 400 are configured to function the same way (e.g., as symmetrical peer database nodes that communicate via gossip protocol, such as Cassandra nodes) with no single point of failure. If one of the nodes in example cluster 400 terminates prematurely ("goes down"), another node can rapidly take the place of the terminated node without disrupting service. The example cluster 400 can be a container for a keyspace, which is a container for data in the distributed decentralized database system (e.g., whereas a database is a container for containers in conventional relational databases, the Cassandra keyspace is a container for a Cassandra database system).

FIG. 5 depicts a block diagram of a malware engine 502 according to an example embodiment. The malware engine 502 comprises a hydrator 504, a mounter 506, a detector 508, a Yet Another Recursive/Ridiculous Acronym YARA rules 510, hashes 512, a flagger 514, a recoverer 516, a privilege determinator 518, user privileges 520, a propagator 522, and a graphical user interface GUI 524.

As will be discussed in more detail below, the malware engine 502 detects indicators of compromise that is present on a snapshot of an object (e.g., virtual machine, database, file system, etc.) that shows the snapshot may have been compromised by malware, such as ransomware. Ransomware is a piece of malware which infects an enterprise and encrypts its data. Embodiments enable an enterprise to quickly recover all protected objects to a safe copy, bringing the business back online as soon as possible, cutting out the malware from IT infrastructure, and restoring the maximum amount of data possible.

In order to initiate a recovery, the malware engine 502 determines the most recent point in time snapshot for each object that was not infected and enables push-button recovery of the determined snapshot using the GUI 524. Specifically, a user can select an object or objects with the GUI 524 to scan snapshots in a snapshot chain of the object, e.g., starting with a most recent snapshot and scanning successively older snapshots (or skipping snapshots) in a snapshot chain (reverse chronological order or other order). Alternatively, a user can specify a range of snapshot to scan as well as specific objects, directories, etc. For each snapshot, the hydrator 504 will hydrate the snapshot (e.g., materialize/instantiate the snapshot e.g., via zero data copy) and the mounter 506 will mount (e.g., read without necessarily writing or transferring data as in a restore) the hydrated snapshot in a virtual machine (e.g., created by the hypervisor 208), which may be sandboxed (e.g., no or limited network access) via, for example, user-mode Linux. The detector 508 then scans the mounted snapshot using YARA rules 510 and/or hashes 512 for malware. YARA rules 510 are a domain-specific language by which intelligence about indicators of compromise can be written and shared for threat hunting purposes. They typically allow for the specification of text or binary based indicators.

The detector 508 can be set to scan for malware based on all or a subset of the hashes 512 and/or the YARA rules 510. For example, a query may be files with hashes A and B modified in the past month. Scanning may also be done by filename. After a snapshot is determined to be infected based on the presence of an indicator of compromise (e.g., matching hash and/or satisfied YARA rule), the GUI 524 can display an interface showing infected versus non-infected snapshots as in example interface 700. The detector 508 can be deployed so that it examines all objects in a system and displays results for all objects as shown in the example interface 700.

The recoverer 516 recovers (e.g., restores, reads, mounts, etc.) non-infected snapshots, and, subject to user privileges 520, can recover infected snapshots and content (files) for forensic analysis, e.g., to a sandboxed virtual machine. The recoverer 516 can also restore non-infected files on infected snapshots. The privilege determinator 518 optionally limits what snapshots or content can be restored based on the user privileges 520. For example, by default, only non-infected snapshots may be restored. However, per user privileges 520, infected snapshots may be restored if a specific user requesting the restore has high enough privileges.

The propagator 522 propagates an infected (quarantine) status for a snapshot or content therein to other locations where a snapshot may be, e.g., archives or replicas of the snapshot, so that the duplicate of the infected snapshot isn't accidentally restored, thereby spreading malware.

FIG. 6 depicts a flowchart illustrating a method 600 of scanning a snapshot for malware according to an example embodiment. In an example embodiment, the storage appliance 300 can execute the method 600 using the malware engine 502. Example methods described herein may also be implemented in the form of executable instructions stored on a machine-readable medium or in the form of electronic circuitry. For instance, the operations of the method 600 may be represented by executable instructions that, when executed by a processor of a computing device, cause the computing device to perform the method 600. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 602, the hypervisor 208 generates a virtual machine, e.g., virtual machine 220, which can be sandboxed (e.g., no or limited network access to prevent the spread of malware to other parts of a network). A snapshot is then mounted at operation 604, e.g., with Rubrik's LIVE-MOUNT. The snapshot may be part of a snapshot chain and accordingly, a most recent snapshot may be mounted or a specific snapshot selected for mounting. A range of snapshots can be specified as well as, snapshots of objects and/or directories. Data within the snapshot is then hydrated with the hydrator 504 at operation 606, which can include materializing/instantiating the snapshot.

The detector 508 then searches the mounted hydrated snapshot for malware at operation 608. Searching can include applying YARA rules 510 and/or looking for matching hashes 512 (e.g., MD5, SHA1, and/or SHA256) and/or looking for specific file names (e.g., by name, such as ABAP/Rivpas.c.intd, and/or by path prefix) and/or path matches. The YARA rules 510 and/or hashes 512 may be imported (e.g., if new YARA rules 510 or hashes 512 are created) and the detector 508 can search for malware 608 using all or a subset of the YARA rules 510 and/or hashes 512.

For example, given a set of Indicators of Compromise encoded as YARA rules in a CISA alert (such as Alert (AA20-302A) Ransomware Activity Targeting the Healthcare and Public Health Sector), the detector 508 identifies any snapshots where those indicators were found. In some examples, the detector 508 identifies files associated with the indicators. Additionally, or alternatively, the detector 508 may receive a set of suspicious file hashes or file paths (such as from Microsoft's Hafnium IOC list) and may identify snapshots including the suspicious file hashes or file paths. In some examples, the detector 508 may analyze each file in a snapshot using one or more of: the YARA rules, suspicious file hashes, and suspicious file paths. Accordingly, the detector 508 may detect malware (e.g., infected files), maliciously encrypted data, or both. Additionally, or alternatively, the detector 508 may analyze sectors of a snapshot (including multiple files) or an entire snapshot using one or more of: the YARA rules, suspicious file hashes, and suspicious file paths.

Further, the detector 508 may restrict a search to specific snapshots or range of snapshots, a subset of files/directories and/or scan a replica of a snapshot instead an original snapshot. Restricting the search can include specific subsets of files or directories; file size limits, file creation/modification timestamps (e.g., before, after, or between timestamp(s)); file ownership; and files added/modified in a current snapshot (i.e., files that were not in prior snapshot or modified since that snapshot). Note that once a file in a snapshot is determined to be infected, it can be inferred that all later snapshots are infected (even if outside of a set range) and/or that specific file in the snapshot will be infected in later snapshots.

If, at operation 610, malware is detected, then a next most recent snapshot in the snapshot chain is mounted and the process is repeated until no malware is detected at operation 610. Further, in case of false negatives, additional snapshots in the chain can be scanned after no malware is detected in operation 610. Alternatively, the mounting 604 through the detecting 610 can start with an oldest or base snapshot and assuming no malware was detected in the base snapshot, repeating the process until malware is detected. Further, once malware is detected in a snapshot, the remainder of the snapshot does not need to be scanned and the next snapshot in the snapshot chain can be searched for malware.

Further, the mounting 604 through the detecting 610 can be repeated for all or some objects of a system including virtual machines, file systems, databases, network attached storage, etc. When malware is detected, metadata in the snapshot can be adjusted to indicate quarantine status. For example, quarantine-related metadata for the infected snapshots (e.g., quarantine status metadata, among other quarantine-related metadata) may be updated for the infected snapshot. Additionally, or alternatively, a ledger (e.g., an append-only ledger, a snapshot-level ledger, etc.) used to keep track of snapshots that have been quarantined, released from quarantine, or both, may be maintained. In some examples, the quarantine related-metadata for a snapshot is updated by updating related fields in a snapshot-level quarantine metadata table. Quarantining a snapshot is described in more detail herein, including with reference to FIG. 11.

At operation 612, the GUI 524 generates an interface, such as example interface 700, as will be discussed in further detail in conjunction with FIG. 7. For each object, the example interface 700 can show snapshots over time with a status (e.g., color coded) of each snapshot (infected, not infected, encrypted, infected and partially encrypted). The example interface 700 may also illustrate a cut point above which snapshots are quarantined due to infection (e.g., not recoverable, recovery not permitted, recoverable with sufficient user privileges, partially recoverable, etc.). The GUI 524 may display object(s) scanned (VM, Host/Share/fileset, etc.); snapshot(s) scanned; Date/time of scan; scan filter criteria; Hash/Rules, etc. being scanned for (e.g., for YARA Rules: i. Rule name ii. Namespace iii. Tags iv. Hash of the rule, etc.); number of matched files; and number of matches; etc.

The GUI 524 may also provide detailed results after a search including: 1. The file name & path where a match was found 2. The rule (hash, or YARA name, namespace and tags) that were matched 3. The time when this file was created 4. The time when this file was modified 5. The owner of this file a. Their fully qualified name (if retrievable) b. Any security identifier (e.g., SID for Windows, User ID for Linux/Unix) 6. The MD5, SHA1, and SHA256 hashes of this file, etc.

A user then, using an interface such as the example interface 700, enters a command to recover a snapshot, which is received at operation 614. If the selected snapshot is determined to be quarantined at operation 616, then the method 600 ends. Else, the snapshot can be recovered by the recoverer 516 at operation 618, which can include mounting and/or restoring, etc. to a specified destination. Recovering snapshots in the context of quarantining is described in more detail herein, including with reference to FIG. 13.

Accordingly, the method 600 enables users to recover data in infected system without compromising recovered systems. For example, the method 600 enables users to restore an object to a point prior to a malware infection by quickly identifying healthy snapshots that can be used to perform a full system restore. Further, as the method 600 quarantines infected snapshots, the method 600 prevents reinfection by malware.

FIG. 7 depicts an example interface 700 according to an example embodiment. The GUI 524 generates the example interface 700 in one embodiment. The example interface 700 illustrates, for each object, a snapshot chain (e.g., in chronological order) and the status of each snapshot in each chain (or for the specified snapshots or range scanned). Further, the example interface 700 may illustrate a cut point indicating a quarantining of snapshots due to infection. For example, snapshots 702 and 708 are below the cut point and therefore not infected and can be restored and not quarantined. On the other hand, snapshot 704 is infected with malware while snapshot 706 is infected with malware and partially encrypted by that malware. On the other hand, snapshot 710 is fully encrypted by malware (which can be determined via entropy measurement).

Figure 8:
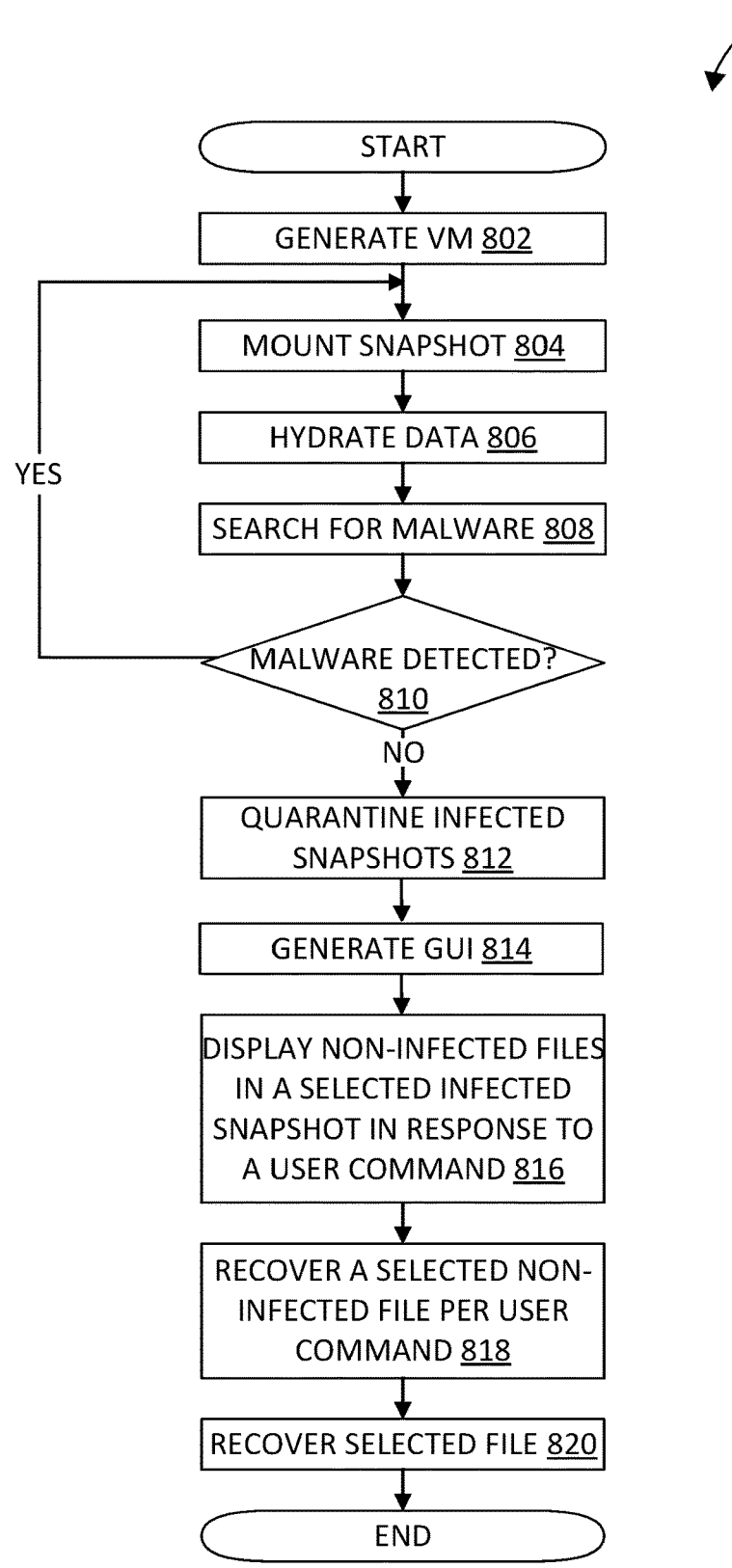
FIG. 8 depicts a flowchart illustrating a method of recovering a non-infected file in an infected snapshot according to an example embodiment.

FIG. 8 depicts a flowchart illustrating a method 800 of recovering a non-infected file in an infected snapshot according to an example embodiment. In an example embodiment, the storage appliance 300 can execute the method 800 using the malware engine 502. Example methods described herein may also be implemented in the form of executable instructions stored on a machine-readable medium or in the form of electronic circuitry. For instance, the operations of the method 800 may be represented by executable instructions that, when executed by a processor of a computing device, cause the computing device to perform the method 800. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 802, the hypervisor 208 generates a virtual machine, e.g., virtual machine 220, which can be sandboxed (e.g., no or minimal network access to prevent the spread of malware to other parts of a network). A snapshot is then mounted at operation 804, e.g., with Rubrik's LIVE-MOUNT. The snapshot may be part of a snapshot chain and accordingly, a most recent snapshot may be mounted or a specific snapshot selected for mounting. Data within the snapshot is then hydrated with the hydrator 504 at operation 806. The detector 508 then searches the mounted hydrated snapshot for malware at operation 808. Searching can include applying YARA rules 510 and/or looking for matching hashes 512 (e.g., MD5, SHA1, and/or SHA256) and/or looking for specific file names (e.g., by name, such as ABAP/Rivpas.c.intd, and/or by path prefix) and/or path matches. The YARA rules 510 and/or hashes 512 may be imported (e.g., if new YARA rules 510 or hashes 512 are created) and the detector 508 can search for malware 808 using all or a subset of the YARA rules 510 and/or the hashes 512.

For example, given a set of Indicators of Compromise encoded as YARA rules in a CISA alert (such as Alert (AA20-302A) Ransomware Activity Targeting the Healthcare and Public Health Sector), the detector 508 may identify any snapshots, file paths, or both, where those indicators were found. Or, given a set of suspicious file hashes or file paths (such as from Microsoft's Hafnium IOC list), the detector 508 may identify those snapshots, file paths, or both as well.

Further, the detector 508 may restrict a search to a range of snapshots, a subset of files/directories and/or scan a replica of a snapshot instead an original snapshot. Restricting the search can include specific snapshots or range of snapshots, specific subsets of files or directories; file size limits, file creation/modification timestamps (e.g., before, after between timestamp(s)); file ownership; and files added/modified in a current snapshot (i.e., files that were not in prior snapshot or modified since that snapshot). Note that once a file in a snapshot is determined to be infected, it can be inferred that all later snapshots are infected (even if outside of a set range) and/or that specific file in the snapshot will be infected in later snapshots.

If, at operation 810, malware is detected, then a next most recent snapshot in the snapshot chain is mounted and the process is repeated until no malware is detected at operation 810. Further, in case of false negatives, additional snapshots in the chain can be scanned after no malware is detected in operation 810. Alternatively, the mounting 804 through the detecting 810 can start with an oldest or base snapshot and assuming no malware was detected in the base snapshot, repeating the process until malware is detected.

Further, the mounting 804 through the detecting 810 can be repeated for all objects of a system including virtual machines, file systems, databases, network attached storage, etc. When malware is detected, metadata in the snapshot can be adjusted to indicate quarantine status.

After the searching 808 is complete, the infected snapshots are quarantined at operation 812, e.g., by adjusting metadata of the infected snapshots (e.g., changing a bit in the metadata for a field that indicates infected, encrypted, etc.). For example, quarantine-related metadata for the infected snapshots (e.g., quarantine status metadata, among other quarantine-related metadata) may be updated for the infected snapshot. Additionally, or alternatively, a ledger (e.g., an append-only ledger, a snapshot-level ledger, etc.) used to keep track of snapshots that have been quarantined, released from quarantine, or both, may be maintained. In some examples, the quarantine related-metadata for a snapshot is updated by updating related fields in a snapshot-level quarantine metadata table. Quarantining a snapshot is described in more detail herein, including with reference to FIG. 11.

At operation 814, the GUI 524 generates an interface, such as the example interface 700. For each object, the example interface 700 can show snapshots over time with a status (e.g., color coded) of each snapshot (infected, not infected, encrypted, infected and partially encrypted). The example interface 700 may also illustrate a cut point above which snapshots are quarantined (e.g., not recoverable, recovery not permitted, recoverable with sufficient user privileges, partially recoverable, etc.). The GUI 524 may display object(s) scanned (VM, Host/Share/fileset, etc.); snapshot(s) scanned; Date/time of scan; scan filter criteria; Hash/Rules, etc. being scanned for (e.g., for YARA Rules: i. Rule name ii. Namespace iii. Tags iv. Hash of the rule, etc.); number of matched files; and number of matches; etc.

The GUI 524 may also provide detailed results after a search including: 1. The file name & path where a match was found 2. The rule (hash, or YARA name, namespace and tags) that were matched 3. The time when this file was created 4. The time when this file was modified 5. The owner of this file a. Their fully qualified name (if retrievable) b. Any security identifier (e.g., SID for Windows, User ID for Linux/Unix) 6. The MD5, SHA1, and SHA256 hashes of this file, etc.

A user then selects an infected snapshot, and the GUI 524 displays a list of non-infected files in the infected snapshot at operation 816 as determined by the search for malware at operation 808. Per a user command, a selected non-infected file from the infected snapshot is then recovered (e.g., mounted, restored, viewed, etc.) at operation 820 with the recoverer 516. The method 800 then ends.

Figure 9:
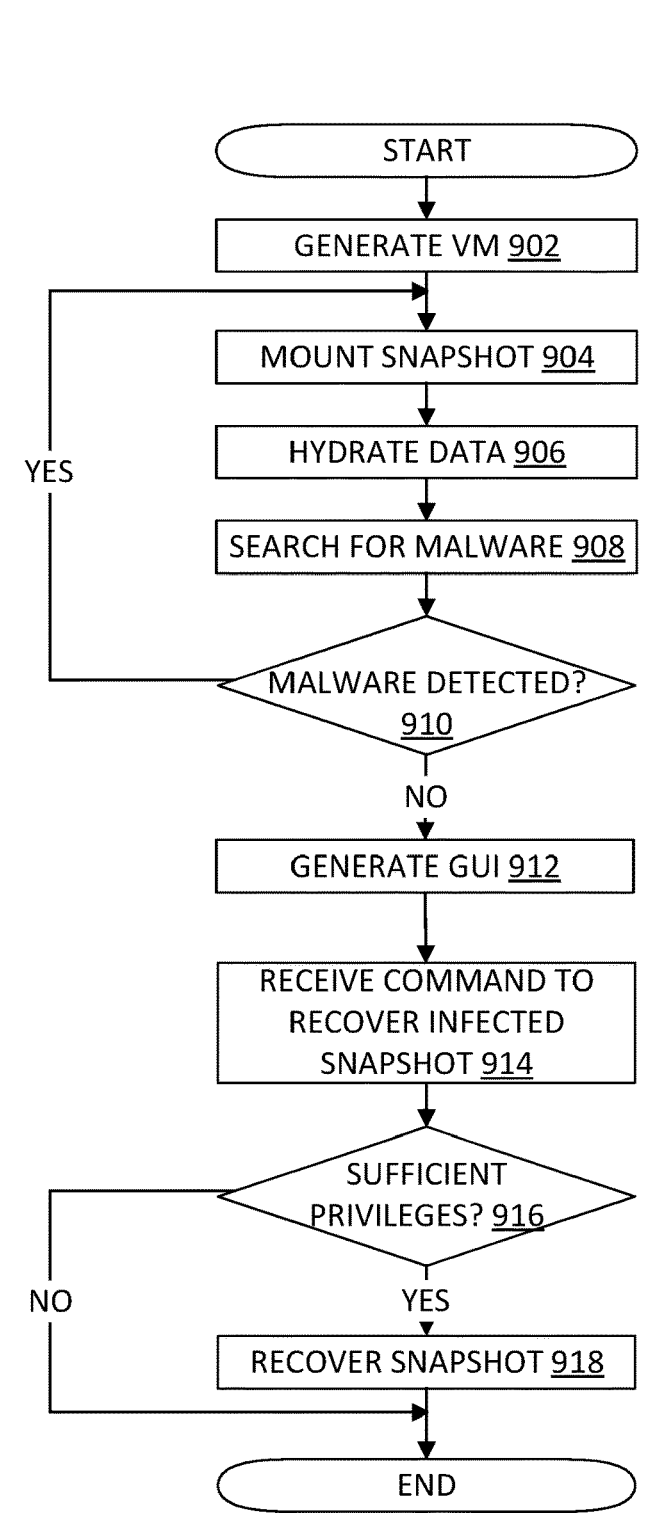
FIG. 9 depicts a flowchart illustrating a method of recovering an infected snapshot according to an example embodiment.

FIG. 9 depicts a flowchart illustrating a method 900 of recovering an infected snapshot according to an example embodiment. In an example embodiment, the storage appliance 300 can execute the method 900 using the malware engine 502. Example methods described herein may also be implemented in the form of executable instructions stored on a machine-readable medium or in the form of electronic circuitry. For instance, the operations of the method 900 may be represented by executable instructions that, when executed by a processor of a computing device, cause the computing device to perform the method 900. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 902, the hypervisor 208 generates a virtual machine, e.g., virtual machine 220, which can be sandboxed (e.g., no network access to prevent the spread of malware to other parts of a network). A snapshot is then mounted at operation 904, e.g., with Rubrik's LIVEMOUNT. The snapshot may be part of a snapshot chain and accordingly, a most recent snapshot may be mounted or a specific snapshot selected for mounting. Data within the snapshot is then hydrated with the hydrator 504 at operation 906. The detector 508 then searches the mounted hydrated snapshot for malware at operation 908. Searching can include applying YARA rules 510 and/or looking for matching hashes 512 (e.g., MD5, SHA1, and/or SHA256) and/or looking for specific file names (e.g., by name, such as ABAP/Rivpas-.c.intd, and/or by path prefix) and/or path matches. The YARA rules 510 and/or hashes 512 may be imported (e.g., if new YARA rules 510 or hashes 512 are created) and the detector 508 can search for malware 908 using all or a subset of the YARA rules 510 and/or hashes 512.

For example, given a set of Indicators of Compromise encoded as YARA rules in a CISA alert (such as Alert (AA20-302A) Ransomware Activity Targeting the Healthcare and Public Health Sector), the detector 508 may identify any snapshots, file paths, or both, where those indicators were found. Or, given a set of suspicious file hashes or file paths (such as from Microsoft's Hafnium IOC list), the detector 508 may identify those snapshots, file paths, or both as well.

Further, the detector 508 may restrict a search to a specific snapshots or range of snapshots, a subset of files/directories and/or scan a replica of a snapshot instead an original snapshot. Restricting the search can include specific subsets of files or directories; file size limits, file creation/modification timestamps (e.g., before, after between timestamp(s)); file ownership; and files added/modified in a current snapshot (i.e., files that were not in prior snapshot or modified since that snapshot).

If, at operation 910, malware is detected, then a next most recent snapshot in the snapshot chain is mounted and the process is repeated until no malware is detected at operation 910. Further, in case of false negatives, additional snapshots in the chain can be scanned after no malware is detected in operation 910. Alternatively, the mounting 904 through the detecting 910 can start with an oldest or base snapshot and assuming no malware was detected in the base snapshot, repeating the process until malware is detected. Further, once malware is detected in a snapshot, the remainder of the snapshot optionally does not need to be scanned and the next snapshot in the snapshot chain can be searched for malware.

Further, the mounting 904 through the detecting 910 can be repeated for all objects of a system including virtual machines, file systems, databases, network attached storage, etc. When malware is detected, metadata in the snapshot can be adjusted to indicate quarantine status. For example, quarantine-related metadata for the infected snapshots (e.g., quarantine status metadata, among other quarantine-related metadata) may be updated for the infected snapshot. Additionally, or alternatively, a ledger (e.g., an append-only ledger, a snapshot-level ledger, etc.) used to keep track of snapshots that have been quarantined, released from quarantine, or both, may be maintained. In some examples, the quarantine related-metadata for a snapshot is updated by updating related fields in a snapshot-level quarantine metadata table. Quarantining a snapshot is described in more detail herein, including with reference to FIG. 11.

At operation 912, the GUI 524 generates an interface, such as the example interface 700. For each object, the example interface 700 can show snapshots over time with a status (e.g., color coded) of each snapshot (infected, not infected, encrypted, infected and partially encrypted). The example interface 700 may also illustrate a cut point above which snapshots are quarantined (e.g., not recoverable, recovery not permitted, recoverable with sufficient user privileges, partially recoverable, etc.). The GUI 524 may display object(s) scanned (VM, Host/Share/fileset, etc.); snapshot(s) scanned; Date/time of scan; scan filter criteria; Hash/Rules, etc. being scanned for (e.g., for YARA Rules: i. Rule name ii. Namespace iii. Tags iv. Hash of the rule, etc.); number of matched files; and number of matches; etc.

The GUI 524 may also provide detailed results after a search including: 1. The file name & path where a match was found 2. The rule (hash, or YARA name, namespace and tags) that were matched 3. The time when this file was created 4. The time when this file was modified 5. The owner of this file a. Their fully qualified name (if retrievable) b. Any security identifier (e.g., SID for Windows, User ID for Linux/Unix) 6. The MD5, SHA1, and SHA256 hashes of this file, etc.

The GUI 524 then receives a command from a user to recover an infected snapshot at operation 914. The privilege determinator 518 then determines at operation 916 if the user has sufficient privileges to recover an infected snapshot based on the user privileges 520, which lists recovery privileges for users for infected snapshots and files. If the user has insufficient privileges, the recoverer 516 will not recover the infected snapshot and the method 900 ends. Otherwise, if the user has sufficient privileges at operation 916 then the recoverer 516 will recover (e.g., mount, restore, examine, read, etc.) the selected infected snapshot at operation 918. Optionally, the selected snapshot can be recovered to a sandboxed virtual machine. The method 900 then ends.

In an embodiment the method 900 may further comprise propagating the quarantine status to other infected snapshots (e.g., replicas of infected snapshots). Quarantine status may be indicated in metadata of a snapshot (e.g., via setting a bit) and the related snapshots can be marked similarly by looking up a record of snapshots and replicas and then marking metadata of the related (e.g., replica) snapshot.

Figure 10:
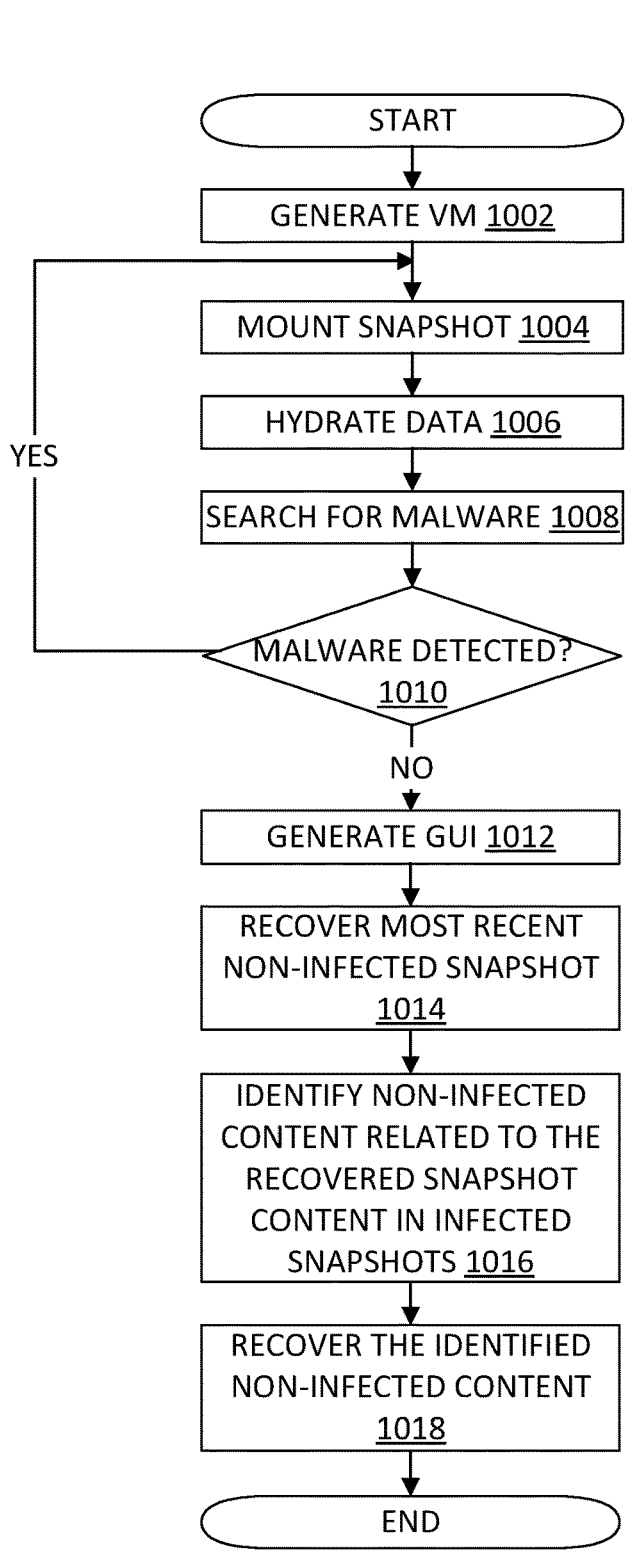
FIG. 10 depicts a flowchart illustrating a method of recovering non-infected content within an infected snapshot according to an example embodiment.

FIG. 10 depicts a flowchart illustrating a method 1000 of recovering non-infected content within an infected snapshot according to an example embodiment. In an example embodiment, the storage appliance 300 can execute the method 1000 using the malware engine 502. Example methods described herein may also be implemented in the form of executable instructions stored on a machine-readable medium or in the form of electronic circuitry. For instance, the operations of the method 1000 may be represented by executable instructions that, when executed by a processor of a computing device, cause the computing device to perform the method 1000. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 1002, the hypervisor 208 generates a virtual machine, e.g., virtual machine 220, which can be sandboxed (e.g., no network access to prevent the spread of malware to other parts of a network). A snapshot is then mounted at operation 1004, e.g., with Rubrik's LIVEMOUNT. The snapshot may be part of a snapshot chain and accordingly, a most recent snapshot may be mounted or a specific snapshot selected for mounting. Data within the snapshot is then hydrated with the hydrator 504 at operation 1006, which can include deduplicating data. The detector 508 then searches the mounted hydrated snapshot for malware at operation 1008. Searching can include applying YARA rules 510 and/or looking for matching hashes 512 (e.g., MD5, SHA1, and/or SHA256) and/or looking for specific file names (e.g., by name, such as ABAP/Rivpas.c.intd, and/or by path prefix) and/or path matches. The YARA rules 510 and/or hashes 512 may be imported (e.g., if new YARA rules 510 or hashes 512 are created) and the detector 508 can search for malware 1008 using all or a subset of the YARA rules 510 and/or hashes 512.

For example, given a set of Indicators of Compromise encoded as YARA rules in a CISA alert (such as Alert (AA20-302A) Ransomware Activity Targeting the Healthcare and Public Health Sector), the detector 508 may identify any snapshots, file paths, or both, where those indicators were found. Or, given a set of suspicious file hashes or file paths (such as from Microsoft's Hafnium IOC list), the detector 508 may identify those snapshots, file paths, or both as well.

Further, the detector 508 may restrict a search to a specific snapshots or range of snapshots, a subset of files/directories and/or scan a replica of a snapshot instead an original snapshot. Restricting the search can include specific subsets of files or directories; file size limits, file creation/modification timestamps (e.g., before, after between timestamp(s)); file ownership; and files added/modified in a current snapshot (i.e., files that were not in prior snapshot or modified since that snapshot).

If, at operation 1010, malware is detected, then a next most recent snapshot in the snapshot chain is mounted and the process is repeated until no malware is detected at operation 1010. Further, in case of false negatives, additional snapshots in the chain can be scanned after no malware is detected in operation 1010. Alternatively, the mounting 1004 through the detecting 1010 can start with an oldest or base snapshot and assuming no malware was detected in the base snapshot, repeating the process until malware is detected.

Further, the mounting 1004 through the detecting 1010 can be repeated for all objects of a system including virtual machines, file systems, databases, network attached storage, etc. When malware is detected, metadata in the snapshot can be adjusted to indicate quarantine status. For example, quarantine-related metadata for the infected snapshots (e.g., quarantine status metadata, among other quarantine-related metadata) may be updated for the infected snapshot. Additionally, or alternatively, a ledger (e.g., an append-only ledger, a snapshot-level ledger, etc.) used to keep track of snapshots that have been quarantined, released from quarantine, or both, may be maintained. In some examples, the quarantine related-metadata for a snapshot is updated by updating related fields in a snapshot-level quarantine metadata table. Quarantining a snapshot is described in more detail herein, including with reference to FIG. 11.

At operation 1012, the GUI 524 generates an interface, such as the example interface 700. For each object, the example interface 700 can show snapshots over time with a status (e.g., color coded) of each snapshot (infected, not infected, encrypted, infected and partially encrypted). The example interface 700 may also illustrate a cut point above which snapshots are quarantined (e.g., not recoverable, recovery not permitted, recoverable with sufficient user privileges, partially recoverable, etc.). The GUI 524 may display object(s) scanned (VM, Host/Share/fileset, etc.); snapshot(s) scanned; Date/time of scan; scan filter criteria; Hash/Rules, etc. being scanned for (e.g., for YARA Rules: i.

Rule name ii. Namespace iii. Tags iv. Hash of the rule, etc.); number of matched files; and number of matches; etc.

The GUI 524 may also provide detailed results after a search including: 1. The file name & path where a match was found 2. The rule (hash, or YARA name, namespace and tags) that were matched 3. The time when this file was created 4. The time when this file was modified 5. The owner of this file a. Their fully qualified name (if retrievable) b. Any security identifier (e.g., SID for Windows, User ID for Linux/Unix) 6. The MD5, SHA1, and SHA256 hashes of this file, etc.

At operation 1014, the most recent non-infected snapshot is recovered (e.g., mounted, restored, etc.). Then, non-infected content related to the recovered snapshot is identified in more recent infected snapshots based on the prior searching 1008 at operation 1016. Then content (e.g., files) from the non-infected snapshot selected by a user can be recovered in the more recent snapshots using forward incremental recovery until an infected or encrypted content is reached corresponding to the selected content. Alternatively, all content can be restored using forward incremental recovery for each content until infected or encrypted content is reached. In this way, the most recent non-infected content available is recovered even if some of the snapshots holding relevant content are infected.

For example, for a selected content including a file in a non-infected snapshot, that file can first be recovered in the most recent non-infected snapshot, then starting with the next (infected) snapshot in the snapshot chain, the next incremental file can be recovered, and repeated until infected or encrypted content is reached. Alternatively, as the snapshots have already been searched for malware at 1008, the most recent infected snapshot with the selected file can be identified and the selected file recovered from that infected snapshot. In effect, while the example interface 700 shows a cut point at the snapshot level, there may be a cut point further up in the snapshot chain on a finer grained level (e.g., content level). The method 1000 then ends.

Figure 11:
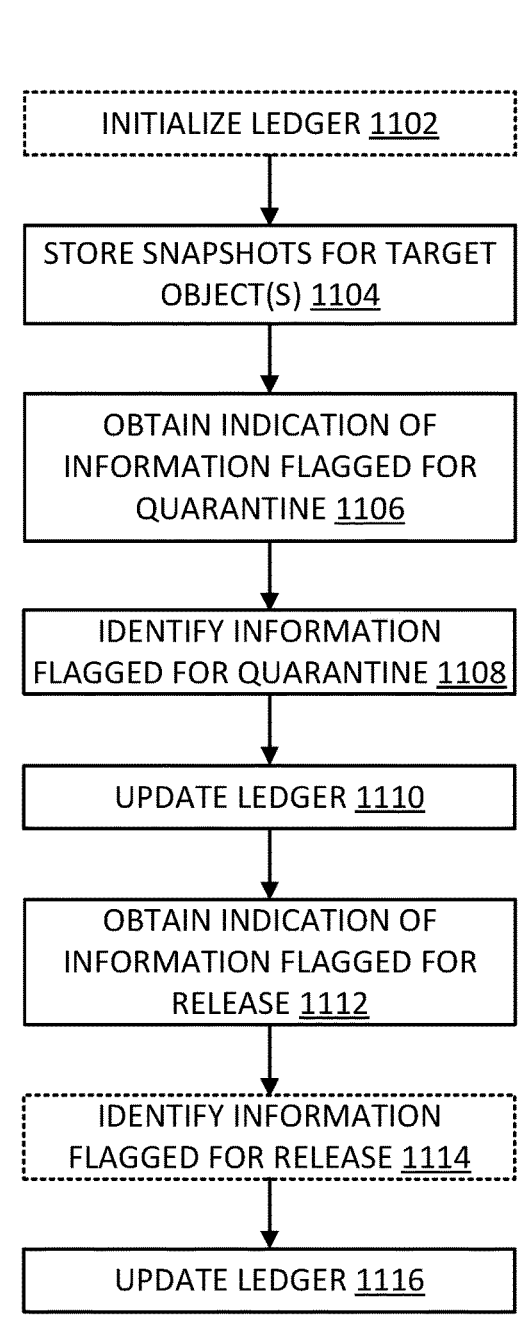
FIG. 11 depicts a flowchart illustrating a method of quarantining information in a snapshot according to an example embodiment.

FIG. 11 depicts a flowchart illustrating a method 1100 of quarantining information in a snapshot according to an example embodiment. In an example embodiment, the storage appliance can execute the method 1100 using the flagger 514. In some examples, the storage appliance is implemented at the data center (e.g., such as storage appliance 300). In some examples, the storage appliance is implemented external to the data center (e.g., such as storage appliance 102). When the storage appliance is implemented external to the data center, the functionality described herein may be provided using a software-as-a-service model. In such cases, the storage appliance may provide a quarantine functionality to end users. The storage applicant may provide access to a service that is used for quarantining information, identifying a range of information to be quarantined (e.g., based on identifying first information to be quarantine); determining a quarantined state of information (e.g., a snappable, snapshot, volume, section, folder, or file); and identifying whether information should be recover (e.g., based on whether the information or related information is quarantined), among other functions. The storage appliance may maintain a ledger that keeps track of the quarantined/released status of information (e.g., the user's information). Also, the storage appliance may provide a user interface for indicating quarantine statuses and releasing and recovering quarantined information.

Example methods described herein may also be implemented in the form of executable instructions stored on a machine-readable medium or in the form of electronic circuitry. For instance, the operations of the method 1100 may be represented by executable instructions that, when executed by a processor of a computing device, cause the computing device to perform the method 1100. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At 1102, a ledger may be initialized (e.g., by the flagger 514) for recording quarantine-related operations—e.g., quarantine operations, release operations (which may also be referred to as unquarantine operations). Initializing the ledger may include allocating memory to the ledger, clearing any data previously stored for the ledger, enabling the use of the ledger, and the like.

The ledger may be an append-only ledger. In such cases, after each quarantine-related operation performed, an indication of the latest performed operation may be added to an end of the ledger. The ledger may include a field for indicating an index of a recorded operation in the ledger, a field for indicating a time when a recorded operation was performed, a field for identifying one or more snapshots associated with a recorded operation, a field for identifying a file or folder that triggered the operation, a field for indicating a quarantine-related status of a snapshot, file, or folder associated with the recorded operation, or any combination thereof. In some examples, the ledger includes a field for identifying an object captured by a snapshot (e.g., a snappable) and indicating a time a snapshot was taken. In some examples, the ledger may include a field identifying a user (e.g., an internal system user or external user) that triggered an operation, a field for user notes (e.g., a description as to why an operation was performed), and a field for operation notes (e.g., a description of a performed operation or result of the performed operation), or any combination thereof. A ledger for recording quarantine-related operations is described in more detail herein, including with reference to FIG. 12.

In some examples, the ledger may be an operation-level ledger. In such cases, a record of each quarantine-related operation (e.g., a quarantine operation, release operation, etc.) performed by the storage appliance for a target object may be maintained. Thus, an operation-level ledger may be used to determine a quarantine state of information in one or more snapshots of the target object as well as to record a history of quarantine operations performed for the target object.

In some examples, the ledger may be a snapshot-level ledger. In such cases, a record of whether a snapshot is in an accessible state, a quarantined state, or a released state may be maintained. In some examples, a record for a snapshot may not be added to the snapshot-level ledger until the snapshot (or information within the snapshot) has been quarantined—e.g., the snapshot-level ledger may have a sparse database structure. In some examples, a record for a snapshot that has been quarantined may be removed from the snapshot-level ledger when the snapshot (or the information within the snapshot) is released from quarantine. In such cases, if a snapshot is not included in the snapshot-level ledger, an absence of the snapshot in the ledger may indicate that the snapshot is in an accessible state. In other examples, each recorded snapshot may be added to the snapshot-level ledger along with a current status (e.g., accessible, quarantined, released) of the snapshot. In some examples, when a snapshot-level ledger is used, the storage appliance may generate a separate audit log for each quarantine-related operation performed to record a history of quarantine operations for a target object. A snapshot-level ledger for recording quarantine-related operations is described in more detail herein, including with reference to FIG. 15.

At 1104, snapshots of one or more target objects may be stored (e.g., in storage device 104 by the storage appliance 300). A target object may be a virtual machine, fileserver, workstation, network attached storage, database, etc. In some examples, a snapshot includes a complete image of a target object (such a snapshot may, for example, be referred to as a base snapshot for the target object). A snapshot may also include an incremental or differential image of a target object—e.g., relative to a complete image of the target object (such a snapshot may, for example, be referred to as an incremental snapshot for the target object). In some examples, snapshots of the one or more target objects may be taken in accordance with a schedule, whenever a change is detected at the target object, or both. For example, a snapshot may be taken of a virtual machine every hour and a snapshot of a file system may be taken each time information in the file system changes.

At 1106, an indication of information flagged for quarantine may be obtained (e.g., at the storage appliance 300 or the storage appliance 102). In some examples, an indication of one or more files flagged for quarantine may be received from the malware engine 502—e.g., based on the malware engine 502 detecting malware within one or more snapshots of a target object. In some examples, the malware engine 502 detects malware within a target object based on detecting an infected or suspicious file or based on detecting maliciously encrypted files in a snapshot. Additionally, or alternatively, and indication of one or more files flagged for quarantine may be received from a user associated with (e.g., that manages) a target object (e.g., a system administrator). In some examples, the user detects and identifies infected, suspicious, or maliciously encrypted files during operation of the target object and sends an indication of the affected files to the storage appliance as being flagged for quarantine. Additionally, or alternatively, the user may detect files that cause or are suspected as causing system crashes, are security vulnerabilities, are not ready for release, and the like, and may send an indication of the identified files to the storage application as being flagged for quarantine. In some examples, the indication sent by the malware engine 502 may include an indication of a snapshot that includes the flagged files.

At 1108, the information flagged for quarantine may be identified (e.g., by the storage appliance 300 or the storage appliance 102). In some examples, the storage appliance compares indicated files with files included in one or more snapshots stored for a target object. For example, the storage appliance may compare the indicated files with each file in each snapshot stored for a target object or for a subset of snapshots stored for the target object (e.g., snapshots taken within a time range). In some examples, the storage appliance uses the hydrator 504 and mounter 506 to materialize and mount the snapshots of the target object (e.g., on a snapshot-by-snapshot basis). The storage appliance may further use the flagger 514 to identify and flag snapshots including the indicated files as well as a file path of the indicated files.

In some examples, the storage appliance may further use the flagger 514 and propagator 522 to identify additional snapshots associated with a snapshot for a target object that includes flagged information. In some examples, the storage appliance identifies earlier versions of a snapshot (e.g., prior snapshots used for restoring the snapshot) that include information flagged for quarantine based on determining that a snapshot includes the information flagged for quarantine. Flagger 514 may flag the identified snapshots as quarantined.

In some examples, the propagator 522 may be used to identify snapshots for the target object occurring after the snapshot, that are based on the snapshot, or both, and flagger 514 may flag the identified snapshots as quarantined. In some examples, before flagging the identified snapshots, the storage appliance may determine whether the identified snapshots include the flagged information. In some cases, after identifying quarantined information in a snapshot, the propagator 522 identifies additional snapshots (e.g., earlier or later snapshots) in one or more chains of snapshots that includes the snapshot. In some examples, an object may be recovered using the snapshots in a chain of snapshots, where different snapshots in the chain of snapshots include partial information for recovering a full set of information.

In some cases, after identifying quarantined information in a snapshot for an object, the flagger 514 may flag information in subsequent snapshots of the object—that occur within a time range of the snapshot. The subsequent snapshots may include snapshots for the object that are outside of a snapshot chain including the initial snapshot. In some examples, the time range is indicated by a user. For example, the flagger 514 may flag subsequent snapshots taken of the object until the user instructs the flagger 514 to stop. In other examples, the user may indicate to the flagger 514 to flag subsequent snapshots that occur up to a designated time period (e.g., a month) after the initial snapshot was taken.

In some examples, the storage appliance identifies versions of the snapshot stored at other locations (e.g., at edge servers, cloud servers, or on-site customer servers). Flagger 514 may flag the versions of the snapshot stored at the other locations as quarantined.

At 1110, the ledger for keeping track of quarantine-related operations (which may also be referred to as a "quarantine metadata table") may be updated based on the identified snapshots, files, or both (e.g., using flagger 514). For example, for each snapshot identified as including flagged information, an entry may be added to the ledger that identifies the snapshot and indicates that the snapshot is in a quarantined state. Additionally, or alternatively, for each file or folder identified as including flagged information, an entry may be added to the ledger that identifies the file or folder and indicates that the file or folder is in a quarantined state. Each entry added to the ledger may also include an indication of a position of the entry within the ledger (e.g., using an index), a time at which the associated information was created (e.g., a time when a snapshot was taken), a time at which the associated information flagged for quarantine was detected, a time at which the entry was added to the ledger, or any combination thereof. In some examples, entries in the ledger that exceed a threshold age (e.g., two years) may be removed from the ledger.

In some examples, if a snapshot-level ledger is used, updating the ledger may include adding a snapshot to the ledger that has been flagged for quarantine or that contains information that has been flagged for quarantine. In other examples, a set of snapshots may already be indicated by the snapshot-level ledger, and updating the snapshot-level ledger may include changing a status of the snapshot (e.g., from an accessible or released state to a quarantined state) and updating the files of the snapshot indicated as quarantined (e.g., if other files of the snapshot are already quarantined).

At 1112, an indication of information flagged for release from quarantine may be received. In some examples, the indication may indicate one or more files, folders, or snapshots to release from quarantine. In some cases, the indication indicates one or more files or folders of a target object to release from quarantine, and the storage appliance identifies a set of snapshots for the target object that includes the files or folders. The indication may be received from a user having certain privileges.

At 1114, an operation for identifying information to release from quarantine may be performed (e.g., the storage appliance 300 or the storage appliance 102). In some example, the operation is performed after determining that the user associated with the indication has a specific or a threshold level of privileges. For example, the storage appliance may perform the operation if the user is a specific user, has administrative privileges, has super-administrative privileges, or a combination thereof. In some examples, before performing the operation, the storage appliance may authenticate the user by requesting a password or key from the user. In some examples, the password or key is different than a login password for the user—e.g., the password may be specific to enabling release operations.

In some examples, as part of the operation for identifying information to release, the storage appliance may identify one or more snapshots including the identified information, as similarly described with reference to identifying information flagged for quarantine.

At 1116, the ledger may be updated (e.g., by flagger 514) based on identifying information to release from the quarantine. Updating the ledger may include adding, for each file path, folder path, or snapshot identified as including the indicated information, an entry identifying the file path, folder path, or snapshot and indicating a released state of the file path, folder path, or snapshot.

In some examples, the indication of information flagged for release identifies a file path, folder path, snapshot, or any combination thereof associated with the information. In such cases, instead of identifying information to release in stored snapshots, the flagger 514 may directly add an entry to the ledger including the indicated file path, folder path, or snapshot identifier and a corresponding released state.

In some examples, when a snapshot-level ledger is used, updating the ledger may include removing or updating a record for a snapshot including the information released from quarantine. Updating the record may include updating a field in the record that indicates information in the snapshot that is quarantined so that the field indicates information that is currently quarantined. In some examples, the record for the snapshot may be removed if all of the information in the snapshot that was quarantined is identified as being released from quarantine.

In some examples, the ledger includes each snapshot regardless of quarantine status. In such cases, the record for the snapshot may not be removed; instead, a status indicated in a field of the record may be updated. For example, if all of the information in the snapshot that was quarantined is identified as being released from quarantine, a status field of the record for the snapshot may be updated to indicate that the record is accessible or has been released from quarantine. Alternatively, if a portion of the information in the snapshot that was quarantined is identified as being released from quarantine, the status field of the record may be maintained and a quarantined information identifier field may be updated to remove the released information.

FIG. 12 illustrates an example ledger that supports recording quarantining and release operations in accordance with examples as disclosed herein.

The ledger 1200 is configured to keep track of snapshots, files, folders, or any combination thereof, that are in a quarantine state as well as snapshots, files, folders, or any combination thereof, that have been released from a quarantine state. In some examples, a ledger (such as the ledger 1200) is maintained for each object backed up by a storage service. The ledger 1200 may include an index field 1205, a time field 1210, a snapshot identifier field 1215, a path identifier field 1220, and an operation identifier field 1225.

The index field 1205 may be used to indicate a position of an entry within the ledger 1200. In some examples, the indices may be used to determine a relative timing of the quarantining or release of information indicated by different entries.

The time field 1210 may be used to indicate a time when the associated information was quarantined or released, when the entry was added to the ledger, or both. Similar to the indices, the timing may similarly be used to determine a relative timing of the quarantining or release of information indicated by different entries.

The snapshot identifier field 1215 may be used to indicate a snapshot that was identified as including information flagged for quarantining or release from quarantine. In some examples, the snapshot identifier field 1215 may indicates multiple snapshots flagged for quarantining or release from quarantine.

The path identifier field 1220 may be used to indicate a path to a file, folder, section, or volume that was identified as including information flagged for quarantining or release from quarantine. The indicated path may be within the snapshot or snapshot(s) identified by snapshot identifier field 1215.

By including the path identifier field 1220 in the ledger 1200, the ledger 1200 may be used to support file-level quarantining. Also, the path identifier field 1220 may be used to indicate to a user which information is preventing restoration. In some examples, the ledger 1200 omits the path identifier field 1220—e.g., if quarantining is performed solely on a snapshot level.

The operation identifier field 1225 may be used to indicate a type of operation performed on the information associated with an entry—e.g., whether the operation was a quarantine operation or a release operation. In some examples, the operation identifier field 1225 indicates that information associated with an entry is quarantined. In other examples, the operation identifier field 1225 indicates that information associated with an entry has been released from quarantine.

In some examples, the ledger 1200 may also include a snapshot time field that indicates a time when a snapshot was taken. The snapshot time field may also include an identifier of an object captured by a snapshot (e.g., a snappable). In some examples, the snapshot time field may be included in the snapshot identifier field 1215. In some examples, the snapshot identifier and snapshot time may be used to identify all quarantine operations performed for an object in a given time range. In some examples, whether a point-in-time copy of an object is quarantined may be based on identifying the quarantine operations performed on an object during a time range—e.g., if the point-in-time copy was obtained within the time range. In some examples, continuous data protection software may use the snapshot identifier and snapshot time information to determine whether a point-in-time copy is quarantined.

In some examples, the snapshot time and the identifier of an object captured by the snapshot may be included in separate fields (e.g., the snapshot time field and the snapshot identifier field 1215. In either case, the identifier of the object may include an index, which may be used to improve a performance of queries by facilitating the identification of all ledger entries for a given object.

The ledger 1200 may also include a hash field. The hash field may include a hash of information (e.g., a section, folder, or a file) flagged for quarantined. The hash may be used to determine whether the information flagged for quarantine has changed since being quarantined. In some examples, a decision of whether to release information from quarantine may be made based on whether the information has changed. For example, if quarantined information has changed since being quarantined, the information may not be recovered. Additionally, or alternatively, the hash may be used to ensure that the file remains quarantined in subsequent snapshots even if the path of the information changes.

In some examples, the ledger 1200 may include a user account field, a user notes field, an operation notes field, or any combination thereof. A user account field may indicate a user associated with a performed operation (e.g., a quarantine or release operation). For example, the user that triggered the operation may be indicated in the user account field. In some examples, the user is an internal system user—e.g., a system user for a threat analysis application. In some examples, the user is an external user (e.g., an IT or system administrator).

A user notes field may be used to indicate notes associated with a performed operation. In some example, the user notes field may indicate why the operation was performed. For example, the user notes field may indicate that a quarantine operation was performed because a suspicious file was identified or unexpectedly encrypted data was identified. In some examples, the user notes field may indicate that a quarantine operation was performed because a system administrator had concerns that particular information was creating system failures. In yet other examples, the user notes field may indicate that a release operation was performed because the information identified by the threat analysis application was a false positive or based on identifying that the quarantined information was not causing the system failures.

An operation notes field may provide information related to the operation. For examples, the operation notes field may indicate that the operation succeeded, a time when the operation was performed, or the like.

In some examples, when information flagged for quarantine is identified, one or more entries associated with the information may be added to the ledger 1200. And if quarantined information is flagged for release, the entry may be removed from the ledger 1200.

In other examples, the ledger 1200 may be an append-only ledger. For example, instead of removing an entry associated with quarantined data if the information associated with the entry is released, an additional entry associated with the information may be added at an end of the ledger 1200 to indicate that the information has been released from quarantine. That is, the ledger 1200 may include a field indicating a quarantine action associated with an entry—e.g., operation identifier field 1225. For example, if information is placed into quarantine, a corresponding entry of the ledger 1200 may indicate a quarantine action for the information. And if the information is released from quarantine, another corresponding entry of the ledger 1200 may indicate a quarantine release action for the information. The ledger 1200 may at any time be consulted and analyzed (e.g., by a storage appliance 300 or a storage appliance 102) to determine the quarantine status of a piece of information (e.g., snapshot) based on the net effect of all entries associated with the information, considering the chronological order of all such entries. For example, if an entry indicating a quarantine action for the information is identified within the ledger 1200, and no subsequent entry indicating a quarantine release action for the information is identified, then it may be determined that the information is quarantined. Alternatively, if an entry indicating a quarantine action for the information is identified within the ledger 1200, a subsequent entry indicating a quarantine release action for the information is identified, and no further subsequent entry indicating another quarantine action for the information is identified, then it may be determined that the information is not quarantined.

In some examples, an indication of information flagged for quarantine is received (e.g., at a storage appliance 300 or a storage appliance 102). The indication may also include an indication of the target object including the information. The storage appliance may analyze a set of snapshots of the target object to determine whether any of the snapshots include the information flagged for quarantine. Based on the analysis, the storage appliance may identify one or more snapshots that include the information—e.g., based on matching one or more indicated files or folders with corresponding files or folders in the one or more snapshots.

In some examples, the storage appliance may add a first entry to the ledger 1200 based on identifying a snapshot that includes the flagged information. The entry may include an index (e.g., index 1), a time when the entry was added to the ledger 1200 and/or when the flagged information was detected, an identifier of the snapshot (e.g., snapshot A), an identifier of the path (e.g., file path, folder path, section ID) to the flagged information, and an indication that the snapshot, file, folder, or any combination thereof, is quarantined. Based on identifying a second snapshot that includes the flagged information, the storage appliance may similarly add a second entry to the ledger 1200—e.g., with an index 2 and an identifier of a snapshot C. In some examples, the storage appliance may identify additional snapshots (e.g., snapshot D) that depend from the identified snapshots (e.g., snapshot A or B) and similarly add additional entries to the ledger 1200. In some examples, instead of adding additional entries to the ledger, the storage appliance may include an indicator of the snapshots depending from an identified snapshot in the snapshot identifier field 1215 of the entry.

In some examples, the storage appliance may add additional entries to the ledger 1200 based on receiving an indication that additional information within a quarantined snapshot is flagged for quarantine. For example, the storage appliance may receive an indication that additional files in snapshot C have been flagged for quarantine. The storage appliance may proceed to add the fifth entry to the ledger 1200 indicating that the additional files in snapshot C are quarantined.

Later, a subsequent indication that information has been flagged for release from quarantine may be received. The storage appliance may analyze a set of snapshots of the target object to determine whether any of the snapshots include the information flagged for release. Based on the analysis, the storage appliance may identify one or more snapshots that include the information—e.g., based on matching one or more indicated files or folders with corresponding files or folders in the one or more snapshots. Alternatively, the storage appliance may analyze the ledger

1200 to determine if any of the quarantined snapshots include the information (e.g., the file path, folder path, or section ID) flagged for release.

In some examples, the indication indicates that a snapshot has been released from quarantined. In some examples, the indication indicates that a section, folder, or file has been released from quarantine.

The storage appliance may add one or more entries to the ledger 1200 indicating the release of quarantined information. For example, an entry may be added that includes an index (e.g., index 10), a time when the entry was added to the ledger 1200, an identifier of the snapshot (e.g., snapshot A), an identifier of the path to the released information, and an indication that the snapshot, file, folder, or any combination thereof, has been released from quarantine (e.g., an indication of an updated status of the information, an indication of the quarantine release action for the information, or both).

In some examples, an entry may indicate that a section, folder, or file in a snapshot has been released from quarantine. For instance, the entry at index 12 may indicate that a folder in snapshot C has been released from quarantine. In some examples, an entry may indicate that an entire snapshot has been released. For instance, the entry at index 13 may indicate that snapshot E has been released from quarantine.

In some examples, the ledger 1200 includes empty entries that have not yet been filled—e.g., if the ledger 1200 is initialized with a certain size.

In some examples, the storage appliance may perform an operation for listing information that is quarantined for an object (which may be referred to as a list quarantined files operation). The list quarantined files operation may add an entry to the ledger 1200 that indicates information (e.g., a list of files or folders) that are quarantined in a snapshot. In some cases, a list of quarantined files may be based on previous quarantine and release operations performed on a snapshot (or earlier snapshots in a chain of snapshots). In some examples, a list of quarantined information for a snapshot may omit information that were listed as quarantined for an earlier snapshot—e.g., if some of the earlier information was released from quarantine or deleted between snapshots. In some examples, a list quarantined files operation may be performed for one or more snapshots, and the resulting list of quarantined files may be input as YARA rules while searching for malware.

FIG. 13 illustrates an example ledger that supports recording quarantining and release operations in accordance with examples as disclosed herein.

The ledger 1300 is configured to keep track of information (e.g., snapshots, files, folders) that are in a quarantine state. In some examples, the ledger 1300 may also be configured to keep track of information that is in an accessible state (e.g., implicitly or explicitly). The ledger may also be configured to keep track of information that is in a released state.

The ledger 1300 may include a snapshot identifier field 1315, a time field 1310, a path identifier field 1320, which may be respective examples of the snapshot identifier field 1215, the time field 1210, the path identifier field 1220 of FIG. 12. The ledger 1300 may also include a quarantine status field 1325. In some examples, the ledger 1300 may include additional fields—e.g., any one or more of the fields supported by the ledger 1200 of FIG. 12 as described herein including with reference to FIG. 12. For example, among others, the ledger 1300 may include an index field, snapshot time field, a hash field, a user account field, a user notes field, an operation notes field, or any combination thereof.

Quarantine status field 1325 may indicate that the information in a corresponding snapshot identified in the snapshot identifier field 1315 is quarantined. In some examples, quarantine status field 1325 is omitted from ledger 1300—e.g., if it is implied that any information included in the ledger 1300 is quarantined.

In some examples, an indication of information flagged for quarantine is received (e.g., at a storage appliance 300 or a storage appliance 102). The indication may also include an indication of the target object including the information. The storage appliance may analyze a set of snapshots of the target object to determine whether any of the snapshots include the information flagged for quarantine. Based on the analysis, the storage appliance may identify one or more snapshots that include the information—e.g., based on matching one or more indicated files or folders with corresponding files or folders in the one or more snapshots.

In some examples, the storage appliance may add a first entry to the ledger 1300 based on identifying a snapshot that includes the flagged information. The entry may include an identifier of the snapshot (e.g., snapshot A), a time when the entry was added to the ledger 1300 and/or when the flagged information was detected, an identifier of the path to the flagged information, and an indication the identified information is quarantined. The storage appliance may similarly add a second entry to the ledger 1300 based on identifying that a second snapshot includes flagged information.

In some examples, the storage appliance adds entries for snapshots that are not identified as including quarantined information. In such cases, the quarantine status field 1325 may indicate that the snapshots are accessible. In other examples, entries for unquarantined snapshots may be omitted from the ledger 1300. In such cases, adding an entry in the ledger may imply that the snapshot indicated by the snapshot identifier field 1315 and/or the information indicated by the path identifier field 1320 is quarantined.

Later, a subsequent indication that additional information has been flagged for quarantine may be received. In some examples, the storage appliance may determine that the additional information is included in a snapshot that already includes quarantined information (e.g., snapshot A). In such cases, the storage appliance may update the entry for snapshot A—e.g., by updating the path identifier field 1320 to indicate the additional information as well as the previously quarantined information.

Later, a subsequent indication that information has been flagged for release from quarantine may be received. In some examples, the information released from quarantine is included in snapshot A, where the released information may be a subset of the quarantined information in snapshot A. In such cases, the path identifier field 1320 of the first entry may be updated to no longer indicate the released information. In some examples, the information released from quarantine is included in snapshot B, where the released information may encompass the quarantined information in snapshot B. In such cases, the second entry may be removed from the ledger 1300. In other examples, instead of removing the second entry, the quarantine status field 1325 of the second entry may be updated to indicate that snapshot B has been released from quarantine.

Figure 14:
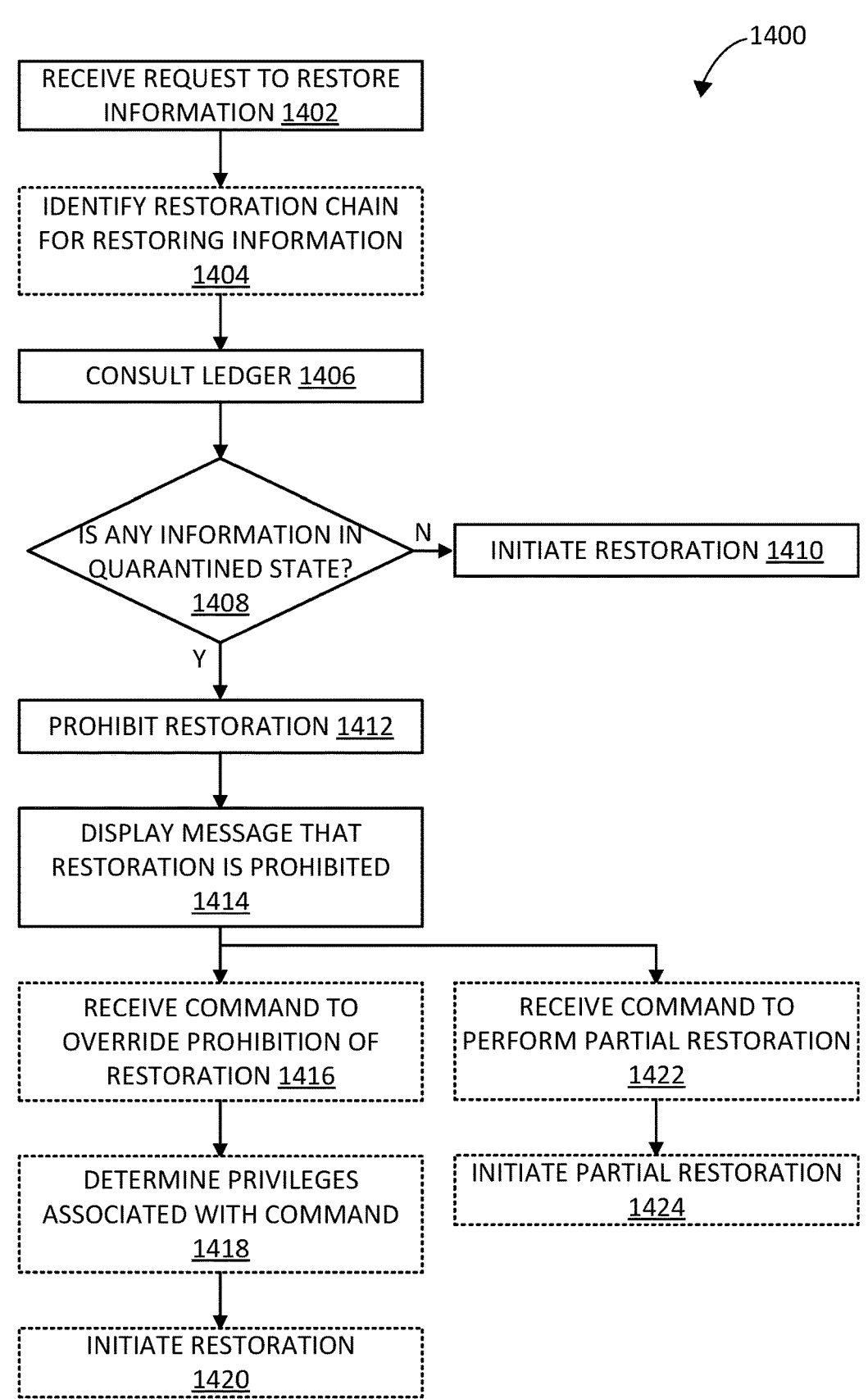
FIG. 14 depicts a flowchart illustrating a method of restoring a requested snapshot in accordance with quarantine information according to an example embodiment.

FIG. 14 depicts a flowchart illustrating a method 1400 of restoring a requested snapshot in accordance with quarantine information according to an example embodiment. In an example embodiment, the storage appliance 300 can execute the method 1400 using the recoverer 516. In some examples, the storage appliance is implemented at the data center (e.g., such as storage appliance 300). In some examples, the storage appliance is implemented external to the data center (e.g., such as storage appliance 102).

Example methods described herein may also be implemented in the form of executable instructions stored on a machine-readable medium or in the form of electronic circuitry. For instance, the operations of the method 1400 may be represented by executable instructions that, when executed by a processor of a computing device, cause the computing device to perform the method 1400. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At 1402, a request to restore information may be received (e.g., at the storage appliance 300 or a storage appliance 102). The request to restore information may include an indication of a file, folder, section, volume, or snapshot associated with a target object.

In some examples, the request may be intercepted by a software layer (which may be referred to as a QuarantineEnforcer) that is used to enforce quarantine conditions for a restoration procedure of a requested snapshot. In some examples, the software layer may be implemented (e.g., as middle-ware) between a front-end of an API that provides access to an application for restoring a requested snapshot and the application for restoring a requested snapshot. The software layer may intercept each call to the API, including indirect calls to the API received from a user via an interface of a system that contains the application and direct calls to the application via a user-accessible interface. The QuarantineEnforcer may also determine a privilege of a user based on the call to the API.

At 1404, a chain of backup information for restoring the requested information may be identified (e.g., by the storage appliance 300 or a storage appliance 102). For example, if the request is for a snapshot of a target object, the storage appliance may identify one or more additional snapshots for rebuilding the requested snapshot—e.g., if the requested snapshot is an incremental or differential snapshot. Similarly, if the request is for a file in a target object, the storage appliance may identify one or more additional files for rebuilding the file. For example, if a request to restore a snapshot C is received, the storage appliance may determine that snapshots A and B are needed to reconstruct snapshot C. In another example, if a request to restore a snapshot G is received, the storage appliance may determine that snapshots C is also are needed to reconstruct snapshot G.

In some examples, a sequence of backup information for an object may be identified. For example, if the request is for a snapshot of a target object, the storage appliance may identify one or more additional snapshots taken for the target object—e.g., the storage appliance may identify one or more snapshots taken within a time range of the requested snapshot. For instance, the storage appliance may identify snapshots taken up to a month before the snapshot, snapshots taken up to a month after the snapshot, or snapshots taken a half-month before and a half-month after the snapshot. Similarly, if the request is for a file in a target object at a time point, the storage appliance may identify one or more additional versions of the file that occurred within a time range of the time point.

At 1406, a ledger (e.g., the ledger 1200 or the ledger 1300) may be consulted (e.g., by the storage appliance 300 or a storage appliance 102) to determine whether the request to restore the information is to be granted. When the ledger 1200 is used, consulting the ledger may include analyzing each entry in the ledger to determine whether any of the information used to reconstruct the requested information has been quarantined. Consulting the ledger may also include analyzing each entry in the ledger to determine whether any of the information has been released from quarantine. When the ledger 1300 is used, consulting the ledger may include identifying and analyzing an entry for one or more snapshots including the information requested for restoration.

At 1408, whether any information used for reconstructing the requested information is in a quarantined state may be determined (e.g., by the storage appliance 300 or a storage appliance 102) based on consulting the ledger.

In some examples and with reference to the ledger 1200, if a request to restore snapshot A is received, the storage appliance may determine that snapshot A, a file in snapshot A, or both was quarantined based on the first entry of the ledger 1200. The storage appliance may further determine that snapshot A, the file in snapshot A, or both has been released from quarantine based on the tenth entry of the ledger 1200—e.g., based on the tenth entry occurring after the first entry, based on the time entries, etc.

In some examples and with reference to the ledger 1200, if a request to restore snapshot C is received, the storage appliance may determine that snapshot C, a folder in snapshot C, a file in snapshot C, or any combination thereof, was quarantined based on the second entry and fifth entry of the ledger 1200. The storage appliance may further determine that the folder in snapshot C was released from quarantine based on the twelfth entry of the ledger 1200. However, the storage appliance may determine that the file in snapshot C remains quarantined based on the information identified by the twelfth entry not including the information identified by the fifth entry.

In some examples and with reference to the ledger 1200, if a request to restore snapshot D is received, the storage appliance may determine that snapshot D, a file within snapshot D, or both, was quarantined based on the fourth entry of the ledger 1200. The storage appliance may further determine that snapshot D, the file within snapshot D, or both, has been released from quarantine based on the eleventh entry of the ledger 1200.

In some examples and with reference to the ledger 1200, if a request to restore snapshot E is received, the storage appliance may determine that snapshot E, a first file in snapshot E, a second file in snapshot E, or both was quarantined based on the third entry of the ledger 1200, the sixth entry of the ledger, or both. The storage appliance may further determine that all of the information in snapshot E has been released from quarantine based on the thirteenth entry of the ledger 1200. In some examples, the storage appliance determines that all of the information in snapshot E has been released from quarantine based on determining that the latest entry for snapshot E (e.g., the thirteenth entry) includes an indication that all of the information in snapshot E has been released from quarantine.

In some examples and with reference to the ledger 1200, if a request to restore snapshot F is received, the storage appliance may analyze the ledger 1200 to determine whether snapshot F is quarantined. Based on the analysis of the ledger 1200, the storage appliance may determine that snapshot F is quarantined based on the Nth entry of the ledger 1200.

In some examples and with reference to the ledger 1200, if a request to restore a snapshot G is received, the storage appliance may determine that snapshot G is not quarantined based on identifying no entries identifying snapshot G. In some examples, before determining that snapshot G is not quarantined, the storage appliance may identify a set of snapshots (including snapshot G) for restoring a computing system to a time G (which may be referred to as the snapshot chain for snapshot G). In some cases, the storage appliance may determine that a snapshot included in the snapshot chain includes quarantined information (e.g., if the snapshot chain includes snapshot C).

In some examples and with reference to the ledger 1300, if a request to restore snapshot A is received, the storage appliance may determine that snapshot A, a file in snapshot A, or both was quarantined based on the first entry of the ledger 1300.

In some examples and with reference to the ledger 1300, if a request to restore snapshot B is received, the storage appliance may determine that the information in snapshot B is accessible for a restoration operation—e.g., based on failing to identify snapshot B in the ledger 1300 in cases where snapshot B was removed from the ledger or determining from the ledger 1300 that snapshot B is released from quarantine in cases where snapshot B is retained in the ledger.

In some examples and with reference to the ledger 1300, if a request to restore snapshot C is received, the storage appliance may determine that the information in snapshot C is accessible for a restoration operation—e.g., based on failing to identify snapshot C in the ledger 1300 or determining from the ledger 1300 that snapshot C is accessible in cases where the quarantine of all snapshots is reflected in the ledger 1300. In some examples, a procedure for consulting a snapshot-level ledger to determine whether requested information is in a quarantined state may be completed in less time than a procedure for consulting an operation-level ledger. Because, for example, each entry in an operation-level ledger may be consulted while a single entry in a snapshot-level ledger may be consulted.

In some examples, the QuarantineEnforcer determines whether a call to the API is attempting to recover quarantined information—e.g., by consulting a ledger, such as ledger 1200 of FIG. 12 or the ledger 1500 of FIG. 15. The Quarantine Enforcer may also determine a privilege of a user that sent the call to the API. Based on the determination of whether the call is attempting to recover quarantined information, the privilege of the user, or both, the QuarantineEnforcer may determine whether to block the call from reaching the application or allowing the call to proceed to the application. In some examples, the QuarantineEnforcer allows the call to reach the application based on determining that the call is not attempting to recover quarantined information, and the storage appliance may proceed to perform the operations described with reference to 1410. In some examples, the QuarantineEnforcer allows the call to reach the application after determining that the call is attempting to recover quarantined information based on determining that the user associated with the call has sufficient privileges to bypass quarantine flags, and the storage appliance may proceed to perform the operations described with reference to 1420. In cases where QuarantineEnforcer allows the call to reach the application after determining that the call is attempting to recover quarantined information based on determining that the user associated with the call has sufficient privileges, QuarantineEnforcer may perform aspects of the operations described with reference to 1412 through 1418.

In some examples, the QuarantineEnforcer blocks the call from reaching the application based on determining that the call is attempting to recover quarantined information. In such cases, the storage appliance may proceed to perform the operations described with reference to 1412.

At 1410, a restoration of the requested information may be initiated (e.g., by the storage appliance 300 or a storage appliance 102). In some examples, the restoration is initiated if the storage appliance determines that the requested information is not quarantined. For example, for a request to restore a snapshot, the storage appliance may initiate the restoration based on determining that the snapshot does not include quarantined information. In another example, for a request to restore a section, folder, or file in a snapshot, the storage appliance may initiate the restoration based on determining that the section, folder, or file does not include quarantined information.

By initiating restoration of requested information based on determining that the requested information is not quarantined, the storage appliance may restore the requested information with less latency than if the storage appliance were to further determine whether earlier information used to rebuild the requested information is quarantined.

In some examples, the restoration is initiated if the storage appliance determines that none of the information used to restore the requested information is identified as being in a quarantined state. For example, for a request to restore a snapshot, the storage appliance may initiate the restoration based on determining that the snapshot as well as any other previously saved snapshots used for the restoration of the snapshot do not include quarantined information. In another example, for a request to restore a section, folder, or file in a snapshot, the storage appliance may initiate the restoration based on determining that any previously saved sections, folders, or files used for the restoration of the section, folder, or file does not include quarantined information.

By determining whether any preceding information for restoring requested information is quarantined before initiating restoration for the requested information, the storage appliance may reduce the risk of restoring unwanted (e.g., infected) information.

At 1412, a restoration of the requested information may be prohibited (e.g., by the storage appliance 300 or a storage appliance 102). In some examples, the restoration is prohibited if the storage appliance determines that the requested information is quarantined. For example, for a request to restore a snapshot, the storage appliance may prohibit the restoration based on determining that the snapshot includes quarantined information. In another example, for a request to restore a section, folder, or file in a snapshot, the storage appliance may prohibit the restoration based on determining that the section, folder, or file includes quarantined information.

In some examples, the restoration is prohibited if the storage appliance determines that any of the information used to restore the requested information is quarantined. For example, for a request to restore a snapshot, the storage appliance may prohibit the restoration based on determining that the snapshot as well as any other previously saved snapshots used for the restoration of the snapshot include quarantined information. In another example, for a request to restore a section, folder, or file in a snapshot, the storage appliance may prohibit the restoration based on determining that any previously saved sections, folders, or files used for the restoration of the section, folder, or file include quarantined information.

In some examples, image level recovery using the snapshot is prohibited if the storage appliance determines that a snapshot used for restoration of the requested information includes any information that is quarantined. In some examples, image level recovery and/or all file recovery using the snapshot are prohibited if the storage appliance determines that a snapshot used for restoration of the requested information includes any information that is quarantined. In some examples, image level recovery and/or recovery of quarantined information (e.g., sections, folder, or files) using the snapshot are prohibited if the storage appliance determines that a snapshot used for restoration of the requested information includes any information that is quarantined.

At 1414, a message indicating that the restoration of the requested information is prohibited may be displayed (e.g., by the storage appliance 300 or a storage appliance 102). The message may include an indication of a snapshot or information within a snapshot that has been quarantined. In some examples, the message includes a command for overriding the prohibition on the restoration of the requested information.

At 1416, a command to override the prohibition may be received (e.g., at the storage appliance 300 or a storage appliance 102). The command may include an indication of a user that sent the command. In some examples, the command includes a password for overriding the prohibition.

At 1418, privileges of the user that sent the command may be determined (e.g., by the storage appliance 300 or a storage appliance 102). In some examples, the storage appliance determines that the user is on a list of one or more users that are permitted to override the prohibition. In some examples, the storage appliance determines that the user is of a type (e.g., an administrator or super-administrator) that is permitted to override the prohibition. In some examples, after identifying that the user is permitted to override the prohibition, the storage appliance further sends a request for a password for overriding the prohibition.

At 1420, restoration of the requested information may be initiated (e.g., by the storage appliance). In some examples, the requested information is restored to a sandboxed environment (e.g., a sandboxed virtual machine) despite the requested information including quarantined information. In some examples, the requested information is restored to a user's environment. In some examples, the restoration of the requested information is performed after determining that the user has sufficient privileges, receiving an override password, or both.

At 1422, a command to perform a partial restoration may be received (e.g., at the storage appliance 300 or a storage appliance 102) in response to the message indicating that the restoration of the requested information is prohibited.

At 1424, the partial restoration may be initiated (e.g., by the storage appliance 300 or a storage appliance 102). In some examples, the partial restoration restores the requested information except that any portion of the requested information that is quarantined is not restored. For example, if a request to partially restore a snapshot is received, the snapshot may be restored except that a set of files, folders, or sections used to reconstruct the snapshot that are quarantined may not be restored with the snapshot.

FIG. 15 illustrates an example ledger that supports recording quarantining and release operations in accordance with examples as disclosed herein.

The ledger 1500 is configured to keep track of snapshots, files, folders, or any combination thereof, that are in a quarantine state as well as snapshots, files, folders, or any combination thereof, that have been released from a quarantine state. In some examples, a ledger (such as the ledger 1500) is maintained for each object (e.g., target) backed up by a storage service. The ledger 1500 may be referred to as a snapshot-level ledger. The ledger 1500 may include a snapshot identifier field 1515, a path identifier field 1520, and an operation identifier field 1525, which may be examples of a snapshot identifier field 1215, a path identifier field 1220, and an operation identifier field 1225 described with reference to FIG. 12. In some examples, the ledger 1500 may include additional or alternative fields, such as the additional field described with reference to the ledger 1200 of FIG. 12.

In some examples, the ledger 1500 may include an entry for each snapshot captured by the data management system. Alternatively, the ledger 1500 may include an entry only for snapshots that have been subjected to a quarantine operation. In some examples, if the ledger 1500 includes an entry for each captured snapshot, then one or more snapshot entries in the ledger may be empty—e.g., no quarantine-related metadata may be recorded for one or more entries that have not been subject to a quarantine operation. The ledger 1500 may be configured to provide a source of truth for quarantine related information. That is, other data structures in the data management system that indicate and/or use quarantine-related metadata for snapshots may consult the ledger 1500 to determine a quarantine status for a snapshot.

FIG. 16 depicts an example recovery timeline that supports recording quarantining and release operations according to an example embodiment.

Recovery timeline 1600 depicts possible time-points for restoring a target object across a time period. The recovery timeline 1600 may include an indicator of possible restore points including snapshots (e.g., the snapshots 1615) and point-in-time restore points, which may be referred to as PITs (e.g., the first PIT 1605-1 and the second PTI 605-2). Point-in-time restore points may enable a user to restore (e.g., in combination with a snapshot) a target object to a particular point-in-time with finer granularity than snapshots.

As described herein, creating snapshot-level restore points may involve capturing a state of a target object (e.g., a state of the file system, metadata, etc.), which may include placing the target object into a frozen state while the snapshot is generated. In some examples, snapshots are generated on a minute-level or hourly-level basis (e.g., down to 15 minute intervals).

Creating point-in-time level restore points may be less resource-intensive and less disruptive to the operation of a target object than creating snapshot-level restore points. In one example, continuous data protection techniques may create PITs on a per second or per millisecond basis (e.g., by capturing inputs/outputs for, e.g., data written to and read from, a memory disk) such that hundreds or thousands of PITs may be created between two snapshots. In such cases, a target object may be continuously restorable down to a second or millisecond, for example.

As described herein, a user may attempt to restore a target object (e.g., to a time that precedes a malware infection). In some examples, the user may indicate a particular point-in-time for recovery (e.g., a particular time-of-day to a millisecond), which may correspond to a particular PIT (e.g., the second PIT 1605-2). As also described herein, quarantine information may be provided on a snapshot and/or file-level basis. Based on receiving a request to restore a target object to a particular point-in-time, the storage appliance may determine a quarantine status of a snapshot associated with the particular point-in-time—e.g., the snapshots that precede or follow the point-in-time. The storage appliance may determine the quarantine status based on consulting a ledger described herein, including with reference to FIG. 12 and FIG. 15.

Based on determining the snapshot is quarantined, the storage appliance may identify a quarantine window that precedes and follows the snapshot. For example, the storage appliance may determine that the quarantine window extends from a preceding snapshot to a following snapshot—e.g., because it may be unknown when between the quarantined snapshot and the previous snapshot the malware infection occurred and when between the quarantined snapshot and a following snapshot (if not also quarantined) the malware infection was addressed. The PITs that fall within the quarantine window may be prevented from being used as restore points.

As an example, the storage appliance may receive a request from a user to restore a target object to the PIT 1605-1. Based on receiving the request, the storage appliance may determine whether the first snapshot 1615-1 is quarantined (e.g., by consulting a ledger described herein, including with reference to FIG. 12 and FIG. 15). Additionally, or alternatively, the storage appliance may determine whether the second snapshot 1615-2 is quarantined. Based on determining that neither the first snapshot 1615-1 nor the second snapshot 1615-2 is quarantined, the storage appliance may determine that the first PIT 1605-1 is a safe recovery point and may restore the target object to the first point-in-time (e.g., using the first snapshot 1615-1 and a forward recovery procedure, using the second snapshot 1615-2 and a reverse recovery procedure).

In another example, the storage appliance may receive a request from a user to restore a target object to the second PIT 1605-2. Based on receiving the request, the storage appliance may determine whether the second snapshot 1615-2 is quarantined. Additionally, or alternatively, the storage appliance may determine whether the third snapshot 1615-3 is quarantined. Based on determining that the third snapshot 1615-3 is quarantined, the storage appliance may generate the quarantine window 1610, which extends from the second snapshot 1615-2 to the fourth snapshot 1615-4. Based on determining that the second point-in-time occurs within the quarantine window 1610, the storage appliance may prevent the target object from being restored to the second PIT 1605-2 (e.g., unless the user has administrative privileges for overriding the quarantine).

In some examples, a user may manually extend the quarantine window—e.g., by designating an unquarantined snapshot as quarantined based on suspecting or determining that the unquarantined snapshot is infected. For example, the user may extend the quarantine window 1610 by designating the second snapshot 1615-2 as quarantined such that the quarantine window 1610 may extend from the first snapshot 1615-1 to the fourth snapshot 1615-4.

In some examples, instead of determining the quarantine window in response to a request to restore a PIT, the storage appliance may determine (e.g., periodically) the quarantine window throughout operation. In such cases, instead of first determining the quarantine window, the storage appliance may immediately determine whether a requested PIT is located within or outside of a quarantine window.

In some examples, a state of a PIT may be set based on determining whether a PIT is located within or outside of a quarantine window. For example, a state of PITs that occur outside of a quarantine window may be designated as recoverable and PITs that occur inside of the quarantine window may be designated as missed.

Although discussed in the context of PITs, quarantine window may be similarly generated and used to designate restore points within the quarantine window as unavailable for recovery. For example, on a snapshot-level basis, a quarantine window may be created between a first snapshot and an earlier snapshot such that any snapshots between the first and earlier snapshot may be prohibited for recovery.

FIG. 17 depicts a flowchart illustrating a method for bulk snapshot recovery according to an example embodiment. In an example embodiment, the storage appliance 300 can execute the method 1700 using the recoverer 516. In some examples, the storage appliance is implemented at the data center (e.g., such as storage appliance 300). In some examples, the storage appliance is implemented external to the data center (e.g., such as storage appliance 102).

Example methods described herein may also be implemented in the form of executable instructions stored on a machine-readable medium or in the form of electronic circuitry. For instance, the operations of the method 1700 may be represented by executable instructions that, when executed by a processor of a computing device, cause the computing device to perform the method 1700. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

As described herein, a data management system (e.g., the data management system 302 of FIG. 3) may protect many target objects (which may also be referred to as snappables or workloads) for a single customer and may take snapshots for all, or most, of the target objects—e.g., in accordance with one or more service level agreements. In some examples, if a customer system is infected, snapshots for different target objects may reflect an infection of a corresponding target object at different times—e.g., based on the propagation of the malware through the customer system, based on different snapshot schedules, etc. For example, after infection of the customer system, a first snapshot taken at a first time may reflect an infection of a first target object, a second snapshot taken at a second time (that occurs after the first time) may reflect an infection of a second target object, a third snapshot taken at a third time (that occurs before the first time) may reflect an infection of a third target object, and so on.

The variation in time with which different snapshots for different target objects reflect an infected target object may complicate the mass recovery of snapshots. That is, this time variation may prevent a customer from recovering all of the snapshots that occur closest to a certain point-in-time because some of the snapshots that are closest to the point-in-time may be healthy while other snapshots that are closest to the point-in-time may be healthy. Moreover, the time range between healthy snapshots for each target object protected by the data recovery system may span a wide time range (e.g., days or weeks) that is unknown to the customer.

At 1702, metadata may be collected for snapshots taken by the data management system, where respective metadata may be collected for individual snapshots taken by the data management system (e.g., as described with reference to the distributed metadata store 310 of FIG. 3). In some examples, first metadata may be generated for a snapshot when a snapshot is taken. For example, a snapshot creation time and an expiration time may be generated for the snapshot. Additional metadata may be generated for the snapshot after the snapshot is taken. For example, if malware is detected for the snapshot during a malware hunting operation (e.g., as described with reference to 604 through 610 of FIG. 6), operating status metadata for the snapshot may be updated to indicate that the snapshot is an anomalous state. Additionally, or alternatively, if a snapshot is identified and quarantined as a threat (e.g., autonomously by the data management system-initiated malware hunting operation or manually by a user-initiated threat hunt), quarantine status metadata for the snapshot may be updated to indicate that the snapshot is in a quarantined state. In some examples, the malware hunting operation is performed each time a snapshot is processed by the data management system. In some examples, if a malware or threat hunting operation has not yet been performed for a snapshot, the operating status metadata and the quarantine status metadata may be set to "null."

The metadata collected for the snapshots may be stored in the distributed metadata store. In some examples, updating the snapshot metadata in the distributed metadata store is an atomic operation such that the snapshot metadata will remain synchronized with the operating and quarantine status of the snapshots. A schema for storing metadata for the snapshots taken by the data management system is described in more detail herein, including with reference to FIG. 18.

At 1704, a request to perform a mass recovery of snapshots stored at the data management system may be received (e.g., by the data management system 302). The request may include an indication of a time range (e.g., an hour range, a day range, a week range, etc.) during which snapshots may be identified for recovery.

At 1706, snapshots that are safe for recovery may be identified (e.g., by a recover, such as the recoverer 516 of FIG. 5). In some examples, the snapshots that are safe for recovery may be identified in accordance with a time range received in the request. If no time range is received in the request, the recoverer may use a default time range—e.g., based on an earliest known infection, using a time range that precedes a current data by a predetermined amount, etc.

To identify snapshots across multiple target objects that are safe for recovery, the metadata stored for the snapshots taken for the target objects may be used to filter the snapshots—e.g., to identify a subset of the snapshots that are within the time range, have not yet expired, are not identified as anomalous, and that are not quarantined. For example, the recoverer may use creation time metadata to identify all of the snapshots that were taken for the target objects within a time range. The recoverer may additionally or alternatively use expiration time metadata to identify whether any of the identified snapshots have expired. Additionally or alternatively, the recoverer may use operation status metadata to identify whether any of the identified snapshots have been marked as in an anomalous state. Additionally or alternatively, the recoverer may use quarantine status metadata to identify whether any of the identified snapshots have been marked as quarantined. The recoverer may flag snapshots that are expired, anomalous, quarantined, or any combination thereof as not available (or, in some examples, not preferred) for mass recovery. Moreover, the remaining snapshots that are not expired, anomalous, or quarantined may be identified as safe snapshots that are available for mass recovery.

In some examples, the recoverer may select a subject of the available snapshots for mass recovery. For example, of the available snapshots, the recoverer may select, for each target object, a single, most recent available snapshot taken for the target object within the time range. In some examples, the recoverer may determine that there are no available snapshots for a target object within the time range.

A first example for identifying safe snapshots is given with reference to the schema 1800 of FIG. 18. In this example, a customer may desire to perform a mass recovery of its computing system on Feb. 1, 2021. Accordingly, the data management system may receive, from the customer (e.g., via a user interface), a request to perform a mass recovery of snapshots taken for the computing system by the data management system. The request may include a time range of Jan. 5, 2021 to Jan. 15, 2021. Based on the request, for a first target object (corresponding to target identifier 1), the recoverer may identify snapshot C as a safe snapshot for recovery—e.g., because snapshot C was taken with the time range, has not yet expired, is not anomalous, is not quarantined, and is the latest of snapshots A through C. For a second target object (corresponding to target identifier 2), the recoverer may identify no safe snapshots—e.g., because snapshots A through C may have all been taken prior to Jan. 5, 2021. For a third target object (corresponding to target identifier 3), the recoverer may identify no safe snapshots even though snapshot C is within the time range—e.g., because snapshots A through C may have all expired prior to Feb. 1, 2021.

For a fourth target object (corresponding to target identifier 4), the recoverer may identify snapshot C as a safe snapshot for recovery even though snapshot B was identified as anomalous and quarantined—e.g., because snapshot C was taken with the time range, has not yet expired, is not anomalous, is not quarantined. In an alternate example, the recoverer may identify no safe snapshots—e.g., because snapshot B was identified as anomalous and quarantined. For an Nth target object (corresponding to target identifier N), the recoverer may identify snapshot C as a safe snapshot even though snapshot C is identified as anomalous—e.g., based on determining that the quarantine status of snapshot C is "released," which may indicate that the user manually released this snapshot from quarantine.

In a second example, instead of including a time range, the request may include a particular time-point (e.g., Jan. 10, 2021) and, in some examples, a search direction (e.g., forward or backward-in-time). Based on the request, for a first target object (corresponding to target identifier 1), the recoverer may identify snapshot C as a safe snapshot for recovery For example, the recoverer may identify snapshot C because snapshot C is the closest-in-time snapshot to the particular time-point that has not yet expired, is not anomalous, and is not quarantined. In another example, if the request indicated a backward-in-time search direction, the recoverer may identify snapshot C because, looking backwards, snapshot C is the closest snapshot to the particular time-point that has not yet expired, is not anomalous, and is not quarantined. In yet another example, if the request indicated a forward-in-time search direction, the recoverer may not identify any snapshots because the only available snapshot (e.g., snapshot D) is anomalous and quarantined.

For a second target object (corresponding to target identifier 2), the recoverer may identify snapshot C as a safe snapshot for recovery—e.g., because snapshots C is closest-in-time snapshot to the particular time-point. In another example, if the request indicated a backward-in-time search direction, the recoverer may identify snapshot C because, looking backwards, snapshot C is the closest snapshot to the particular time-point that has not yet expired, is not anomalous, and is not quarantined. In yet another example, if the request indicated a forward-in-time search direction, the recoverer may not identify any snapshots because there may be no existing snapshots after the particular time-point.

For a third target object (corresponding to target identifier 3), the recoverer may identify no safe snapshots even though the snapshots are not anomalous or quarantined—e.g., because snapshots A through C may have all expired prior to Feb. 1, 2021.

For a fourth target object (corresponding to target identifier 4), the recoverer may identify snapshot C as a safe snapshot for recovery even though snapshot B was identified as anomalous and quarantined. For example, the recover may identify snapshot C because snapshot C is the closest-in-time to the particular time-point that has not yet expired and (though anomalous) has been released. In another example, if the request indicated a backward-in-time search direction, the recoverer may identify no snapshots as available for recovery because, looking backwards, snapshot B is anomalous and quarantined and because snapshot A is expired. In yet another example, if the request indicated a forward-in-time search direction, the recoverer may identify snapshot C because snapshot C is the closest-in-time to the particular time-point that has not yet expired and (though anomalous) has been released.

At 1708, the safe snapshots identified for mass recovery may be indicated via a user interface (e.g., to a customer). In some examples, a safe snapshot for each target object may be indicated via the user interface. In some examples, an indication that no safe snapshots were identified for one or more target objects were identified may be indicated via the user interface. In some examples, a single target object may be associated with multiple target identifiers—e.g., if the data management system stores a primary and replicas of the target object. In such cases, a single snapshot for recovering the target object may be indicated via the user interface.

In some cases, the data management system may receive a second request via the user interface to identify, within a second time range (e.g., an earlier time range) snapshots for the one or more target object lacking safe snapshots. In some examples, the second request may further indicate that the recoverer is to interpret expired snapshots as safe snapshots for the second request. With reference to FIG. 18 and the above first example, the second request may indicate a time range of Dec. 20, 2020 to Jan. 4, 2021. In such cases, for the second target object (corresponding to target identifier 2), the recoverer may identify snapshot C as a safe snapshot for recovery—e.g., because snapshot C is within the time range. And for the third target object (corresponding to target identifier 3), the recoverer may identify snapshot C as a safe snapshot for recovery despite snapshot C being expired—e.g., because snapshot C is within the time range and is the latest of snapshot B and C.

With reference to FIG. 18 and the above second example, the second request may indicate a different time-point (e.g., Jan. 5, 2021) and a backward-in-time search direction. In such cases, for the third target object (corresponding to target identifier 3), the recoverer may identify snapshot C as a safe snapshot for recovery—e.g., because snapshot C is the closest-in-time snapshot to the particular time-point that is not anomalous or quarantined.

In some examples, at a first user interface level, a first button for recovering all of the snapshots may be indicated for recovering all of the safe snapshots identified by the recoverer may be presented via the user interface. Additionally, at the user interface first level, a second button for viewing all of the target objects for which no safe snapshots were identified may be presented via the user interface. In some examples, at a second user interface level, the safe snapshots identified for each of the target objects may be presented via the user interface. In such cases, a customer may be able to select, via the second user interface level, specific snapshots (or groups of snapshots) of the safe snapshots for recovery, the specific snapshots corresponding to specific target objects. In some examples, at a third user interface level, for a selected target object, snapshots other than the suggested snapshots identified may be presented via the user interface. In such cases, an indication of which of the other snapshots are anomalous or quarantined may also be indicated by the user interface.

At 1710, a selection of the safe snapshots to recover may be received (e.g., via the user interface). In some examples, the selection of the safe snapshots includes a selection of all of the safe snapshots indicated via the user interface. In other examples, the selection of the safe snapshots includes a selection of a portion of the safe snapshots indicated (via the user interface) for a portion of the target object. In such cases, the selection of the safe snapshots may also include a selection of other non-recommended snapshots for one or more of the remaining target objects. In some examples, the selection of the safe snapshots also includes a selection of individual snapshots for one or more target objects for which no safe snapshots were indicated.

At 1712, the safe snapshots may be recovered (e.g., by the recoverer) in response to the selection of the safe snapshots to recover. Recovering the safe snapshot may include restoring the files of the target objects to the time-point of the respective safe snapshots to the customer's system, to a sandboxed environment, or both.

FIG. 18 depicts a flowchart illustrating a schema that supports bulk snapshot recovery according to an example embodiment.

The schema 1800 (which may be referred to as a "snapshot properties table") may be configured to store metadata for each snapshot taken by a data management system. In some example, the schema 1800 is extensible so that any or no metadata (e.g., in addition to the metadata shown in FIG. 18) may be stored for a snapshot—e.g., the schema 1800 may be a sparse database structure where certain snapshot entries do not include any associated metadata. The schema 1800 may include the target identifier field 1805, the snapshot identifier field 1810, the creation time field 1815, the expiration time field 1820, the operating status field 1825, and the quarantine status field 1830. The schema 1800 may also include additional or alternative fields, such as an encryption status field for indicating whether data in the snapshot is encrypted.

The target identifier field 1805 may indicate an index of a target object managed by a customer and protected by a data management system. As described herein, a data management system may protect multiple (e.g., tens or hundreds of) target objects for a single customer. The index of the target object may be used to identify an identity of a corresponding target object.

The snapshot identifier field 1810 may indicate an index of a snapshot taken for a particular target object. In some examples, multiple snapshots may be taken for a single target object. In some examples, a value of the snapshot identifier may indicate a position of a corresponding snapshot in a chain of snapshots.

The creation time field 1815 may indicate a time when a snapshot was taken—e.g., a day, month, year, and time of day. In some examples, the date information in the creation time field 1815 for a snapshot may prevent the snapshot from being suggested as a safe snapshot—e.g., if the date information indicates that the snapshot was taken outside of a requested time range.

The expiration time field 1820 may indicate a time when a snapshot expires—e.g., a day, month, year, and time of day. In some examples, a snapshot expires pursuant to a service level agreement with a customer. In some examples, an expired snapshot may remain accessible (e.g., internally) until the snapshot is deleted. In some examples, the date information in the expiration time field 1820 for a snapshot may prevent the snapshot from being suggested as a safe snapshot—e.g., if the date information indicates that the snapshot has expired.

The operating status field 1825 may indicate whether malware has been identified in the snapshot during a malware scan performed by the data management system. In some examples, the operating status field 1825 may be updated for a snapshot each time the data management system accesses the snapshot—e.g., if the data management system-directed malware scan is configured for the target object. If malware is identified for a snapshot, the corresponding operating status field may be set to "anomalous." If no malware is identified, the corresponding operating status field may be set to "not anomalous" (which may also be referred to as "nominal"). Prior to the initial malware scan for the snapshot, the corresponding operating status field may be set to "null." In some examples, a data management system-directed malware scan is not set configured for the target object, and the operating status field for the snapshots of the target object may remain as "null." In some examples, the operating status field 1825 is set to "null" if a malware scan for the snapshot failed during operation or failed to be performed.

In some examples, the operating status information in the expiration status field 1825 for a snapshot may prevent the snapshot from being suggested as a safe snapshot—e.g., if the operating status indicates that the snapshot is in an "anomalous" state. In some examples, the operating status information in the expiration status field 1825 prevents the snapshot from being suggested as a safe snapshot if the operating status indicates that the snapshot is in a "null" state. In other examples, the operating status information in the expiration status field 1825 does not prevent the snapshot from being suggested as a safe snapshot if the operating status indicates that the snapshot is in the "null" state. In some cases, when the operating status indicates a snapshot in the "null" state, whether the snapshot is identified as safe for recovery is based on whether an earlier snapshot in the snapshot chain for the target object is in an "anomalous" state—e.g., if the earlier snapshot is in a "not anomalous" state, the current snapshot may be identified as safe for recovery.

The quarantine status field 1830 may indicate whether a snapshot (or any information in a snapshot) has been quarantined, is currently quarantined, or both. If a snapshot is quarantined, the corresponding quarantined status field may be set to "quarantined." If a snapshot is not quarantined, the corresponding quarantined status field may be set to "not quarantined." If a snapshot has been released from a prior quarantine, the corresponding quarantined status field may be set either to "not quarantined" or to "released."

In some examples, a snapshot is quarantined as a result of a data management system-directed threat scan. In such cases, the quarantine status field 1830 may indicate that the data management system quarantined the snapshot. Additionally, or alternatively, a snapshot may be quarantined as a result of a user-directed threat scan. In such cases, the quarantine status field 1830 may indicate that the user quarantined the snapshot. In some examples, a user may release a previously quarantined (e.g., by the system or the user) snapshot from quarantine—e.g., based on resolving the threat, dismissing the threat as a false positive, or the like. In such cases, the quarantine status field 1830 may indicate that the user manually released the snapshot.

In some examples, the data entered in the quarantine status field 1830 is retrieved from a ledger (e.g., an append-only or snapshot-level ledger) described with reference herein, including with reference to FIGS. 11 through 14). In some examples, the data in the quarantine status field 1830 is checked for consistency with the ledger prior to identifying safe snapshots for recovery. In some examples, the data in the quarantine status field 1830 is checked for consistency with the ledger after a crash recovery. In some examples, the data in the quarantine status field 1830 is periodically checked for consistency with the ledger. By checking for inconsistencies between the ledger and quarantine status field 1830, mismatch between the ledger and quarantine status field 1830 and race conditions for the between the ledger and quarantine status field 1830 may be mitigated.

FIG. 19 depicts a block diagram that supports bulk snapshot recovery according to an example embodiment.

The subsystem 1900 may include a user interface 1905 and a snapshot management component 1910. The snapshot management component 1910 may be implemented in a software layer of a storage application (e.g., as described with reference to FIG. 3) and may be configured to generate snapshots for target objects protected by the data management system. The snapshot management component 1910 may be further configured to process the snapshots generated for the target object (e.g., to identify threats) and to suggest snapshots for the bulk recovery of the target objects. The snapshot management component 1910 may include the snapshot component 1915, the snapshot property component 1920, the bulk recovery component 1925, the threat identification component 1930, and the quarantine component 1935.

The snapshot component 1915 may be configured to generate snapshots for the target objects—e.g., in accordance with respective service level agreements for the target objects. The snapshots generated by the snapshot component 1915 may have expiration dates based on the respective service level agreements and respective creation dates.

The snapshot property component 1920 may be configured to store metadata for generated snapshots. In some examples, the snapshot property component 1920 may update the metadata stored for the snapshots over time. For example, the snapshot property component 1920 may store creation date metadata and expiration date metadata for a snapshot after the snapshot is generated. Later, the snapshot property component 1920 may update the metadata stored for the snapshot to include an indication of whether the snapshot is in an anomalous state (e.g., if a threat is detected in the snapshot during a threat scanning operation). Also, the snapshot property component 1920 may update the metadata stored for the snapshot to include an indication of whether the snapshot is in a quarantined state (e.g., if the snapshot is quarantined after the threat is detected).

In some examples, to store the metadata for the generated snapshots, the snapshot property component 1915 is configured to update a database (e.g., the schema 1800 of FIG. 18) that stores metadata for individual snapshots taken by the snapshot component 1915. The database may be referred to as a snapshot properties table. The snapshot property component 1915 may be configured to update the database using atomic operations to ensure the metadata in the snapshot properties table remains consistent with the state of the snapshots.

The bulk recovery component 1925 may be configured to identify a set of suggested snapshots for recovering the target objects—e.g., in response to a request received via the user interface 1905. The bulk recovery component 1925 may use the metadata stored for the snapshots to identify the set of suggested snapshots for recovering the target objects. To identify the set of suggested snapshots, the bulk recovery component 1925 may be configured to filter, using the metadata, the snapshots to identify snapshots that are available for recovery of the target objects—e.g., by identifying the snapshots that are within a time range received in the request, are not expired, are not in an anomalous state, and are not quarantined. In some examples, after identifying the snapshots that are available for recovery for the target objects, the bulk recovery component 1925 may be configured to identify one or more suggested snapshots for the target objects for which at least one available snapshot is identified. For example, the bulk recovery component 1925 may be configured to identify, for each of the target objects, the snapshot of one or more available snapshots identified for the target object that has a creation date that is closest to the current date. The bulk recovery component 1925 may be further configured to indicate the suggested snapshots (e.g., to a customer) via the user interface.

The threat identification component 1930 may be configured to identify threats in the generated snapshots. In some examples, the threat identification component 1930 is configured to autonomously scan snapshots after generation—e.g., if the corresponding service level agreement includes a subscription to a threat hunting service. Additionally, or alternatively, the threat identification component 1930 may be configured to manually scan the generated snapshots based on a set of rules generated by a customer. Based on a scanning operation, the threat identification component 1930 may be configured to determine whether a snapshot is in an anomalous state. In some examples, the threat identification component 1930 may be configured to update the snapshot properties table (described with reference to the snapshot property component 1920) to indicate whether respective snapshots are in an anomalous state.

The quarantine component 1935 may be configured to quarantine snapshots—e.g., based on a result of a threat scanning operation. In some examples, the quarantine component 1935 is further configured to update the snapshot properties table (described with reference to the snapshot property component 1920) to indicate whether respective snapshots are in a quarantined state.

The following set of examples describe various embodiments of methods, computer-readable media, and systems (e.g., machines, devices, or other apparatus) discussed herein.

A method is described. The method may include receiving, by a data management system, a request to restore a plurality of target objects of a computing system, the data management system storing a plurality of snapshots for the plurality of target objects and metadata for the plurality of snapshots; filtering, by the data management system, the plurality of snapshots in response to the request, wherein the filtering comprises using the metadata for the plurality of snapshots to obtain a set of snapshots that are available for restoring respective target objects for at least a subset of the plurality of target objects; identifying, by the data management system, from among the set of snapshots obtained by the filtering, suggested snapshots that are available for restoring respective target objects for at least the subset of the plurality of target objects; and indicating, by the data management system, the suggested snapshots that are available for restoring the respective target objects for at least the subset of the plurality of target objects.

An apparatus is described. The apparatus may include a processor, memory coupled with the processor, and instructions stored in the memory. The instructions may be executable by the processor to cause the apparatus to receive, by a data management system, a request to restore a plurality of target objects of a computing system, the data management system storing a plurality of snapshots for the plurality of target objects and metadata for the plurality of snapshots; filter, by the data management system, the plurality of snapshots in response to the request, wherein the filtering comprises using the metadata for the plurality of snapshots to obtain a set of snapshots that are available for restoring respective target objects for at least a subset of the plurality of target objects; identify, by the data management system, from among the set of snapshots obtained by the filtering, suggested snapshots that are available for restoring respective target objects for at least the subset of the plurality of target objects; and indicate, by the data management system, the suggested snapshots that are available for restoring the respective target objects for at least the subset of the plurality of target objects.

Another apparatus is described. The apparatus may include means for receiving, by a data management system, a request to restore a plurality of target objects of a computing system, the data management system storing a plurality of snapshots for the plurality of target objects and metadata for the plurality of snapshots; means for filtering, by the data management system, the plurality of snapshots in response to the request, wherein the filtering comprises using the metadata for the plurality of snapshots to obtain a set of snapshots that are available for restoring respective target objects for at least a subset of the plurality of target objects; means for identifying, by the data management system, from among the set of snapshots obtained by the filtering, suggested snapshots that are available for restoring respective target objects for at least the subset of the plurality of target objects; and means for indicating, by the data management system, the suggested snapshots that are available for restoring the respective target objects for at least the subset of the plurality of target objects.

A non-transitory computer-readable medium storing code is described. The code may include instructions executable by a processor to receive, by a data management system, a request to restore a plurality of target objects of a computing system, the data management system storing a plurality of snapshots for the plurality of target objects and metadata for the plurality of snapshots; filter, by the data management system, the plurality of snapshots in response to the request, wherein the filtering comprises using the metadata for the plurality of snapshots to obtain a set of snapshots that are available for restoring respective target objects for at least a subset of the plurality of target objects; identify, by the data management system, from among the set of snapshots obtained by the filtering, suggested snapshots that are available for restoring respective target objects for at least the subset of the plurality of target objects; and indicate, by the data management system, the suggested snapshots that are available for restoring the respective target objects for at least the subset of the plurality of target objects.

In some examples of the method, apparatuses, and non-transitory computer-readable medium described herein, storing the metadata for the plurality of snapshots comprises storing creation time information, expiration time information, anomalous state information, encryption information, quarantine information, target identification information, or any combination thereof for the plurality of snapshots.

Some examples of the method, apparatuses, and non-transitory computer-readable medium described herein may further include operations, features, means, or instructions for generating, for a target object of the plurality of target objects, a snapshot of the plurality of snapshots; and updating a data structure to include an entry for the snapshot, the entry comprising metadata for the snapshot, the metadata for the snapshot including a creation time, an expiration time, a target identifier, or any combination thereof.

Some examples of the method, apparatuses, and non-transitory computer-readable medium described herein may further include operations, features, means, or instructions for performing, based at least in part on generating the snapshot, a malware scan for the snapshot; determining whether the snapshot is anomalous based at least in part on performing the malware scan; and updating the metadata of the entry for the snapshot to include an indication of whether the snapshot is anomalous.

Some examples of the method, apparatuses, and non-transitory computer-readable medium described herein may further include operations, features, means, or instructions for performing, based at least in part on generating the snapshot, a quarantine operation for the snapshot; and updating the metadata of the entry for the snapshot to include an indication that the snapshot is quarantined.

In some examples of the method, apparatuses, and non-transitory computer-readable medium described herein filtering the plurality of snapshots comprises filtering, based at least in part on a time range associated with the request, the plurality of snapshots to obtain a subset of snapshots of the plurality of snapshots, wherein each snapshot of the set of snapshots is included in the subset and has respective creation date metadata indicating a creation date within the time range.

In some examples of the method, apparatuses, and non-transitory computer-readable medium described herein filtering the plurality of snapshots comprises filtering, based at least in part on a current date, the plurality of snapshots to obtain a subset of snapshots that are valid, wherein each snapshot of the subset of snapshots is included in the subset and has respective expiration date metadata indicating an expiration date that occurs after the current date.

In some examples of the method, apparatuses, and non-transitory computer-readable medium described herein filtering the plurality of snapshots comprises filtering the plurality of snapshots to obtain a subset of snapshots that are in a nominal state, wherein each snapshot of the subset of snapshots is included in the subset and has respective operating status metadata indicating a nominal status.

In some examples of the method, apparatuses, and non-transitory computer-readable medium described herein filtering the plurality of snapshots comprises filtering the plurality of snapshots to obtain a subset of snapshots that are in a not quarantined state, wherein each snapshot of the subset of snapshots is included in the subset and has respective quarantine status metadata indicating an unquarantined status.

In some examples of the method, apparatuses, and non-transitory computer-readable medium described herein identifying the suggested snapshots comprises identifying, for a target object of at least the subset of the plurality of target objects, one or more snapshots in the set of snapshots that are available for restoring; and selecting, for the target object, a snapshot of the one or more snapshots with a most recent creation date for restoring the target object, wherein indicating the suggested snapshots comprises indicating the selected snapshot.

Some examples of the method, apparatuses, and non-transitory computer-readable medium described herein may further include operations, features, means, or instructions for indicating, for a second subset of the plurality of target objects, a lack of available snapshots for restoring the second subset of the plurality of target objects.

Some examples of the method, apparatuses, and non-transitory computer-readable medium described herein may further include operations, features, means, or instructions for receiving, in response to indicating the lack of available snapshots, a second request to restore the computing system, the second request associated with a second time range that is different than a time range associated with the request.

Some examples of the method, apparatuses, and non-transitory computer-readable medium described herein may further include operations, features, means, or instructions for receiving, in response to indicating the lack of snapshots, a selection of respective snapshots for the second subset of the plurality of target objects.

Some examples of the method, apparatuses, and non-transitory computer-readable medium described herein may further include operations, features, means, or instructions for receiving, via a user interface, a selection to restore all of the respective target objects associated with the suggested snapshots; and restoring, in response to the selection, all of respective target objects associated with the suggested snapshots to the computing system.

Some examples of the method, apparatuses, and non-transitory computer-readable medium described herein may further include operations, features, means, or instructions for receiving, via a user interface, a selection of one or more snapshots of the suggested snapshots indicated for restoring one or more of the respective target objects; and restoring, in response to the selection, the one or more of the respective target objects to the computing system using the selected one or more snapshots.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

Although examples have been described with reference to specific example embodiments or methods, it will be evident that various modifications and changes may be made to these embodiments without departing from the broader scope of the embodiments. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This detailed description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method, comprising:

performing, by a data management system, a malware scan to scan for malware within a plurality of respective sets of snapshots of a plurality of computing objects of a computing system;

updating, by the data management system based at least in part on a result of the malware scan, a data structure comprising a plurality of entries storing metadata for the plurality of respective sets of snapshots of the plurality of computing objects of the computing system, wherein the plurality of respective sets of snapshots comprises a respective set of multiple snapshots for each computing object included in the plurality of computing objects and wherein updating the data structure comprises:

updating respective metadata stored in first respective entries of the plurality of entries for a first set of snapshots included in the plurality of respective sets of snapshots to indicate that snapshots in the first set of snapshots are anomalous based at least in part on detection of the malware in the first set of snapshots during the malware scan;

receiving, by the data management system, a request to restore the plurality of computing objects, the request indicating a recovery time range, and the data management system storing the plurality of respective sets of snapshots and the metadata for the plurality of respective sets of snapshots;

filtering, by the data management system, the plurality of entries of the data structure to obtain a subset of entries associated with a second set of snapshots from among the plurality of respective sets of snapshots that are available for restoring two or more computing objects of the plurality of computing objects, wherein the subset of entries is obtained via the filtering based at least in part on second respective entries of the subset of entries for the second set of snapshots indicating that respective creation times of the second set of snapshots satisfy the recovery time range and further based at least in part on the second set of snapshots being exclusive of the first set of snapshots that are indicated by the first respective entries as being anomalous; and indicating, by the data management system, at least two snapshots from among the second set of snapshots, the at least two snapshots comprising at least one respective snapshot for each of the two or more computing objects that are available for restoring the two or more computing objects.

2. The method of claim 1, wherein the metadata for the plurality of respective sets of snapshots comprises creation time information, expiration time information, anomalous state information, encryption information, quarantine information, target identification information, or any combination thereof for the plurality of respective sets of snapshots.

3. The method of claim 1, further comprising:

generating, for a computing object of the plurality of computing objects, a snapshot of the plurality of respective sets of snapshots; and updating the data structure to include an entry for the snapshot, the entry comprising first respective metadata for the snapshot, and the first respective metadata for the snapshot including a creation time, an expiration time, a target identifier, or any combination thereof.

4. The method of claim 3, further comprising:

determining whether the snapshot is anomalous based at least in part on performing the malware scan; and updating the first respective metadata of the entry for the snapshot to include an indication of whether the snapshot is anomalous.

5. The method of claim 3, further comprising:

performing, based at least in part on generating the snapshot, a quarantine operation for the snapshot; and updating the first respective metadata of the entry for the snapshot to include an indication that the snapshot is quarantined.

6. The method of claim 1, wherein filtering the data structure comprises:

filtering, based at least in part on a current date, the plurality of entries to obtain the subset of entries associated with a subset of snapshots that are valid, wherein each snapshot of the second set of snapshots is included in the subset of snapshots that are valid and has respective expiration date metadata indicating an expiration date that occurs after the current date.

7. The method of claim 1, wherein filtering the data structure comprises:

filtering the plurality of entries to obtain the subset of entries associated with a subset of snapshots that are in a nominal state, wherein each snapshot of the second set of snapshots is included in the subset of snapshots that are in the nominal state and has respective operating status metadata indicating a nominal status.

8. The method of claim 1, wherein filtering the data structure comprises:

filtering the plurality of entries to obtain the subset of entries associated with a subset of snapshots that are in an unquarantined state, wherein each snapshot of the second set of snapshots is included in the subset of snapshots that are in the unquarantined state and has respective quarantine status metadata indicating an unquarantined status.

9. The method of claim 1, further comprising:

identifying, for a computing object of at least the two or more computing objects, one or more snapshots in the plurality of respective sets of snapshots that are available for restoring; and selecting, for the computing object, a snapshot of the one or more snapshots with a most recent creation date for restoring the computing object, wherein indicating the at least two snapshots comprises indicating the selected snapshot.

10. The method of claim 1, further comprising:

indicating, for a second subset of the plurality of computing objects, a lack of available snapshots for restoring the second subset of the plurality of computing objects.

11. The method of claim 10, further comprising:

receiving, in response to indicating the lack of available snapshots, a second request to restore the computing system, the second request associated with a second time range that is different than the recovery time range associated with the request.

12. The method of claim 10, further comprising:

receiving, in response to indicating the lack of available snapshots, a selection of respective snapshots for the second subset of the plurality of computing objects.

13. The method of claim 1, further comprising:

receiving, via a user interface, a selection to restore all of the two or more computing objects associated with the at least two snapshots; and restoring, in response to the selection, all of the two or more computing objects associated with the at least two snapshots to the computing system.

14. The method of claim 1, further comprising:

receiving, via a user interface, a selection of one or more snapshots of the at least two snapshots indicated for restoring one or more of the two or more computing objects; and restoring, in response to the selection, the one or more of the two or more computing objects to the computing system using the selected one or more snapshots.

15. An apparatus, comprising:

a processor; and a memory storing instructions that, when executed by the processor, cause the apparatus to:

perform, by a data management system, a malware scan to scan for malware within a plurality of respective sets of snapshots of a plurality of computing objects of a computing system;

update, by the data management system based at least in part on a result of the malware scan, a data structure comprising a plurality of entries storing metadata for the plurality of respective sets of snapshots of the plurality of computing objects of the computing system, wherein the plurality of respective sets of snapshots comprises a respective set of multiple snapshots for each computing object included in the plurality of computing objects, and wherein, to update the data structure, the instructions, when executed by the processor, cause the apparatus to:

update respective metadata stored in first respective entries of the plurality of entries for a first set of snapshots included in the plurality of respective sets of snapshots to indicate that snapshots in the first set of snapshots are anomalous based at least in part on detection of the malware in the first set of snapshots during the malware scan;

receive, by the data management system, a request to restore the plurality of computing objects, the request indicating a recovery time range, and the data management system storing the plurality of respective sets of snapshots and the metadata for the plurality of respective sets of snapshots;

filter, by the data management system, the plurality of entries of the data structure to obtain a subset of entries associated with a second set of snapshots from among the plurality of respective sets of snapshots that are available for restoring two or more computing objects of the plurality of computing objects, wherein the subset of entries is obtained via the filtering based at least in part on second respective entries of the subset of entries for the second set of snapshots indicating that respective creation times of the second set of snapshots satisfy the recovery time range and further based at least in part on the second set of snapshots being exclusive of the first set of snapshots that are indicated by the first respective entries as being anomalous; and indicate, by the data management system, at least two snapshots from among the second set of snapshots, the at least two snapshots comprising at least one respective snapshot for each of the two or more computing objects that are available for restoring the two or more computing objects.

16. The apparatus of claim 15, wherein the instructions are further executable by the processor to cause the apparatus to:

store creation time information, expiration time information, anomalous state information, quarantine information, target identification information, or any combination thereof for the plurality of respective sets of snapshots.

17. The apparatus of claim 15, wherein the instructions are further executable by the processor to cause the apparatus to:

generate, for a computing object of the plurality of computing objects, a snapshot of the plurality of respective sets of snapshots; and update the data structure to include an entry for the snapshot, the entry comprising first respective metadata for the snapshot, and the first respective metadata for the snapshot including a creation time, an expiration time, a target identifier, or any combination thereof.

18. A non-transitory, computer-readable medium storing code comprising instructions executable by a processor of a device to cause the device to:

perform, by a data management system, a malware scan to scan for malware within a plurality of respective sets of snapshots of a plurality of computing objects of a computing system;

update, by the data management system based at least in part on a result of the malware scan, a data structure comprising a plurality of entries storing metadata for the plurality of respective sets of snapshots of the plurality of computing objects of the computing system, wherein the plurality of respective sets of snapshots comprises a respective set of multiple snapshots for each computing object included in the plurality of computing objects, and wherein, to update the data structure, the instructions are executable by the processor of the device to cause the device to:

update respective metadata stored in first respective entries of the plurality of entries for a first set of snapshots included in the plurality of respective sets of snapshots to indicate that snapshots in the first set of snapshots are anomalous based at least in part on detection of the malware in the first set of snapshots during the malware scan;

receive, by the data management system, a request to restore the plurality of computing objects, the request indicating a recovery time range, and the data management system storing the plurality of respective sets of snapshots and the metadata for the plurality of respective sets of snapshots;

filter, by the data management system, the plurality of entries of the data structure to obtain a subset of entries associated with a second set of snapshots from among the plurality of respective sets of snapshots that are available for restoring two or more computing objects of the plurality of computing objects, wherein the subset of entries is obtained via the filtering based at least in part on second respective entries of the subset of entries for the second set of snapshots indicating that respective creation times of the second set of snapshots satisfy the recovery time range and further based at least in part on the second set of snapshots being exclusive of the first set of snapshots that are indicated by the first respective entries as being anomalous; and indicate, by the data management system, at least two snapshots from among the second set of snapshots, the at least two snapshots comprising at least one respective snapshot for each of the two or more computing objects that are available for restoring the two or more computing objects.

19. The non-transitory, computer-readable medium of claim 18, wherein the instructions are further executable by the processor to cause the device to:

store creation time information, expiration time information, anomalous state information, quarantine information, target identification information, or any combination thereof for the plurality of respective sets of snapshots.

20. The apparatus of claim 17, wherein the instructions are further executable by the processor to cause the apparatus to:

determine whether the snapshot is anomalous based at least in part on performing the malware scan; and update the first respective metadata of the entry for the snapshot to include an indication of whether the snapshot is anomalous.

* * * * *